(12) United States Patent
Terrazas

(10) Patent No.: US 11,924,509 B2
(45) Date of Patent: *Mar. 5, 2024

(54) METHODS AND APPARATUS TO DETERMINE ENGAGEMENT LEVELS OF AUDIENCE MEMBERS

(71) Applicant: The Nielsen Company (US), LLC, New York, NY (US)

(72) Inventor: Alejandro Terrazas, Santa Cruz, CA (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/750,141

(22) Filed: May 20, 2022

(65) Prior Publication Data

US 2022/0279245 A1 Sep. 1, 2022

Related U.S. Application Data

(63) Continuation of application No. 17/341,104, filed on Jun. 7, 2021, now Pat. No. 11,700,421, which is a continuation of application No. 16/360,976, filed on Mar. 21, 2019, now Pat. No. 11,032,610, which is a continuation of application No. 16/209,635, filed on Dec. 4, 2018, now Pat. No. 10,992,985, which is a
(Continued)

(51) Int. Cl.
*H04N 21/442* (2011.01)
*H04N 21/41* (2011.01)
*H04N 21/4223* (2011.01)

(52) U.S. Cl.
CPC . *H04N 21/44218* (2013.01); *H04N 21/41265* (2020.08); *H04N 21/4223* (2013.01); *H04N 21/44231* (2013.01)

(58) Field of Classification Search
CPC ........ H04N 21/41265; H04N 21/4223; H04N 21/44218; H04N 21/44231
See application file for complete search history.

(56) References Cited

U.S. PATENT DOCUMENTS

| | | |
|---|---|---|
| 4,677,466 A | 6/1987 | Lert, Jr. et al. |
| 4,695,879 A | 9/1987 | Weinblatt |

(Continued)

FOREIGN PATENT DOCUMENTS

| | | |
|---|---|---|
| WO | 99/27668 | 6/1999 |
| WO | 2004030350 | 4/2004 |

(Continued)

OTHER PUBLICATIONS

United States Patent and Trademark Office, "Notice of Allowance," mailed in connection with U.S. Appl. No. 13/728,515, dated Feb. 19, 2014, 13 pages.

United States Patent and Trademark Office, "Non-final Office Action," issued in connection with U.S. Appl. No. 14/281,139, dated Nov. 3, 2015, 11 pages.

United States Patent and Trademark Office, "Notice of Allowance," mailed in connection with U.S. Appl. No. 14/281,139, dated Mar. 16, 2016, 7 pages.

(Continued)

*Primary Examiner* — Rong Le

(57) ABSTRACT

Methods and apparatus to determine engagement levels of audience members are disclosed. An example apparatus includes means for detecting whether an environment associated with a first device includes a second device with a display that is illuminated. The example apparatus also includes means for calculating an engagement of a user with respect to the first device based on a proximity between the user and the illuminated display.

30 Claims, 8 Drawing Sheets

Related U.S. Application Data continuation of application No. 15/206,932, filed on Jul. 11, 2016, now Pat. No. 10,171,869, which is a continuation of application No. 14/281,139, filed on May 19, 2014, now Pat. No. 9,407,958, which is a continuation of application No. 13/728,515, filed on Dec. 27, 2012, now Pat. No. 8,769,557.

(56) References Cited

U.S. PATENT DOCUMENTS

| | | |
|---|---|---|
| 4,858,000 A | 8/1989 | Lu et al. |
| 4,859,050 A | 8/1989 | Borah et al. |
| 4,870,579 A | 9/1989 | Hey |
| 5,031,228 A | 7/1991 | Lu |
| 5,305,464 A | 4/1994 | Frett |
| 5,331,544 A | 7/1994 | Lu et al. |
| 5,550,928 A | 8/1996 | Lu |
| 5,676,138 A | 10/1997 | Zawilinski |
| 5,842,199 A | 11/1998 | Miller et al. |
| 5,983,129 A | 11/1999 | Cowan et al. |
| 5,987,154 A | 11/1999 | Gibbon et al. |
| 6,014,461 A | 1/2000 | Hennessey et al. |
| 6,190,314 B1 | 2/2001 | Ark et al. |
| 6,292,688 B1 | 9/2001 | Patton |
| 6,297,859 B1 | 10/2001 | George |
| 6,422,999 B1 | 7/2002 | Hill |
| 6,453,241 B1 | 9/2002 | Bassett, Jr. et al. |
| 6,652,283 B1 | 11/2003 | Van Schaack et al. |
| 6,714,665 B1 | 3/2004 | Hanna et al. |
| 7,024,024 B1 | 4/2006 | Aiazian |
| 7,043,056 B2 | 5/2006 | Edwards et al. |
| 7,440,593 B1 | 10/2008 | Steinberg et al. |
| 7,587,728 B2 | 9/2009 | Wheeler et al. |
| 7,602,524 B2 | 10/2009 | Eichhorn et al. |
| 7,631,324 B2 | 12/2009 | Buonasera et al. |
| 7,636,456 B2 | 12/2009 | Collins et al. |
| 7,636,748 B2 | 12/2009 | Duarte et al. |
| 7,676,065 B2 | 3/2010 | Wiedemann et al. |
| 7,697,735 B2 | 4/2010 | Adam et al. |
| 7,782,297 B2 | 8/2010 | Zalewski et al. |
| 7,787,697 B2 | 8/2010 | Ritzau et al. |
| 7,796,154 B2 | 9/2010 | Senior et al. |
| 7,882,514 B2 | 2/2011 | Nielsen et al. |
| 7,899,209 B2 | 3/2011 | Greiffenhagen et al. |
| 7,930,199 B1 | 4/2011 | Hill |
| 8,150,109 B2 | 4/2012 | Sung et al. |
| 8,230,457 B2 | 7/2012 | Lee et al. |
| 8,296,172 B2 | 10/2012 | Marci et al. |
| 8,620,088 B2 | 12/2013 | Lee |
| 8,660,307 B2 * | 2/2014 | Srinivasan ............ G06V 20/53 |
| | | 382/192 |
| 8,684,742 B2 | 4/2014 | Siefert |
| 8,737,745 B2 | 5/2014 | Deng |
| 8,761,442 B2 | 6/2014 | Srinivasan et al. |
| 8,764,652 B2 | 7/2014 | Lee et al. |
| 8,769,557 B1 | 7/2014 | Terrazas |
| 8,782,681 B2 | 7/2014 | Lee et al. |
| 8,793,715 B1 | 7/2014 | Weitzenfeld et al. |
| 8,973,022 B2 | 3/2015 | Lee et al. |
| 8,984,622 B1 | 3/2015 | Baldwin et al. |
| 9,020,189 B2 | 4/2015 | Lee et al. |
| 9,082,004 B2 | 7/2015 | Nielsen |
| 9,092,675 B2 | 7/2015 | Srinivasan et al. |
| 9,275,285 B2 | 3/2016 | Srinivasan et al. |
| 9,407,958 B2 | 8/2016 | Terrazas |
| 9,454,646 B2 | 9/2016 | Siefert |
| 9,465,999 B2 | 10/2016 | Srinivasan et al. |
| 9,514,436 B2 | 12/2016 | Marci et al. |
| 9,514,439 B2 | 12/2016 | Marci et al. |
| 9,560,267 B2 | 1/2017 | Nielsen |
| 9,760,898 B2 | 9/2017 | Besehanic et al. |
| 9,843,717 B2 | 12/2017 | Nielsen |
| 9,936,250 B2 | 4/2018 | Marci et al. |
| 10,102,486 B1 | 10/2018 | Kaiser et al. |
| 10,165,177 B2 | 12/2018 | Nielsen |
| 10,171,869 B2 | 1/2019 | Terrazas |
| 10,198,713 B2 | 2/2019 | Marci et al. |
| 10,242,270 B2 | 3/2019 | Srinivasan et al. |
| 10,248,195 B2 | 4/2019 | Siefert |
| 10,314,510 B2 | 6/2019 | Marci et al. |
| 10,536,757 B2 | 1/2020 | Borawski et al. |
| 10,771,844 B2 | 9/2020 | Marci et al. |
| 10,810,440 B2 | 10/2020 | Srinivasan et al. |
| 10,839,350 B2 | 11/2020 | Marci et al. |
| 10,992,985 B2 | 4/2021 | Terrazas |
| 11,032,610 B2 | 6/2021 | Terrazas |
| 11,200,964 B2 | 12/2021 | Siefert |
| 11,245,839 B2 | 2/2022 | Nielsen |
| 11,290,779 B2 | 3/2022 | Marci et al. |
| 11,470,243 B2 | 10/2022 | Nielsen |
| 2001/0013009 A1 | 8/2001 | Greening et al. |
| 2001/0031072 A1 | 10/2001 | Dobashi et al. |
| 2002/0002525 A1 | 1/2002 | Arai et al. |
| 2002/0010919 A1 | 1/2002 | Lu et al. |
| 2002/0013717 A1 | 1/2002 | Ando et al. |
| 2002/0059577 A1 | 5/2002 | Lu et al. |
| 2002/0073417 A1 | 6/2002 | Kondo et al. |
| 2003/0005430 A1 | 1/2003 | Kolessar |
| 2003/0046683 A1 | 3/2003 | Jutzi |
| 2003/0081834 A1 | 5/2003 | Philomin et al. |
| 2003/0093784 A1 | 5/2003 | Dimitrova et al. |
| 2003/0093792 A1 | 5/2003 | Labeeb et al. |
| 2004/0088289 A1 | 5/2004 | Xu et al. |
| 2004/0122679 A1 | 6/2004 | Neuhauser et al. |
| 2004/0183749 A1 | 9/2004 | Vertegaal |
| 2004/0219184 A1 | 11/2004 | Brown et al. |
| 2005/0117783 A1 | 6/2005 | Sung et al. |
| 2005/0172311 A1 | 8/2005 | Hjelt et al. |
| 2005/0280008 A1 | 12/2005 | Ricks et al. |
| 2006/0026642 A1 | 2/2006 | Schaffer et al. |
| 2006/0041548 A1 | 2/2006 | Parsons et al. |
| 2006/0062429 A1 | 3/2006 | Ramaswamy et al. |
| 2006/0129458 A1 | 6/2006 | Maggio |
| 2006/0133699 A1 | 6/2006 | Widrow et al. |
| 2006/0251292 A1 | 11/2006 | Gokturk et al. |
| 2007/0066916 A1 | 3/2007 | Lemos |
| 2007/0150916 A1 | 6/2007 | Begole et al. |
| 2007/0154063 A1 | 7/2007 | Breed |
| 2007/0162927 A1 | 7/2007 | Ramaswamy et al. |
| 2007/0244739 A1 | 10/2007 | Soito et al. |
| 2007/0250901 A1 | 10/2007 | McIntire et al. |
| 2007/0263934 A1 | 11/2007 | Ojima et al. |
| 2007/0294126 A1 | 12/2007 | Maggio |
| 2008/0048120 A1 | 2/2008 | Gooch |
| 2008/0059988 A1 * | 3/2008 | Lee ................. H04N 21/44218 |
| | | 725/9 |
| 2008/0091512 A1 | 4/2008 | Marci et al. |
| 2008/0097854 A1 | 4/2008 | Young |
| 2008/0147742 A1 | 6/2008 | Allen |
| 2008/0221400 A1 | 9/2008 | Lee et al. |
| 2008/0222670 A1 | 9/2008 | Lee et al. |
| 2008/0232650 A1 | 9/2008 | Suzuki et al. |
| 2008/0243590 A1 | 10/2008 | Rich |
| 2008/0255904 A1 | 10/2008 | Park et al. |
| 2008/0271065 A1 | 10/2008 | Buonasera et al. |
| 2008/0295126 A1 | 11/2008 | Lee et al. |
| 2009/0070798 A1 | 3/2009 | Lee et al. |
| 2009/0088610 A1 | 4/2009 | Lee et al. |
| 2009/0091650 A1 | 4/2009 | Kodama |
| 2009/0131764 A1 | 5/2009 | Lee et al. |
| 2009/0177528 A1 | 7/2009 | Wu et al. |
| 2009/0265215 A1 | 10/2009 | Lindstrom |
| 2009/0307084 A1 | 12/2009 | Monighetti et al. |
| 2009/0310829 A1 | 12/2009 | Baba et al. |
| 2009/0328089 A1 | 12/2009 | Pradeep et al. |
| 2010/0004977 A1 | 1/2010 | Marci et al. |
| 2010/0046797 A1 | 2/2010 | Strat et al. |
| 2010/0066822 A1 | 3/2010 | Steinberg et al. |
| 2010/0162285 A1 * | 6/2010 | Cohen ................. H04N 21/262 |
| | | 725/12 |
| 2010/0211439 A1 * | 8/2010 | Marci ................. H04N 21/252 |
| | | 705/7.29 |
| 2010/0245567 A1 | 9/2010 | Krahnstoever et al. |
| 2010/0274372 A1 | 10/2010 | Nielsen et al. |

(56) References Cited

U.S. PATENT DOCUMENTS

| | | |
|---|---|---|
| 2010/0290538 A1 | 11/2010 | Xu et al. |
| 2011/0019924 A1 | 1/2011 | Elgersma et al. |
| 2011/0122255 A1 | 5/2011 | Haritaoglu |
| 2011/0137721 A1 | 6/2011 | Bansal |
| 2011/0164188 A1 | 7/2011 | Karaoguz et al. |
| 2011/0169953 A1 | 7/2011 | Sandler et al. |
| 2011/0243459 A1 | 10/2011 | Deng |
| 2011/0265110 A1 | 10/2011 | Weinblatt |
| 2011/0285845 A1 | 11/2011 | Bedros et al. |
| 2012/0027299 A1 | 2/2012 | Ran |
| 2012/0081392 A1 | 4/2012 | Arthur |
| 2012/0120296 A1* | 5/2012 | Roberts .............. H04N 21/4126 348/333.12 |
| 2012/0124604 A1* | 5/2012 | Small ................ H04N 21/4223 725/12 |
| 2012/0151079 A1 | 6/2012 | Besehanic et al. |
| 2012/0253921 A1 | 10/2012 | Pradeep et al. |
| 2012/0314914 A1 | 12/2012 | Karakotsios et al. |
| 2012/0324493 A1 | 12/2012 | Holmdahl et al. |
| 2013/0013396 A1 | 1/2013 | Vinson et al. |
| 2013/0015946 A1 | 1/2013 | Lau et al. |
| 2013/0051677 A1 | 2/2013 | Lee |
| 2013/0055300 A1 | 2/2013 | Hanina |
| 2013/0103624 A1 | 4/2013 | Thieberger |
| 2013/0119649 A1 | 5/2013 | Sato et al. |
| 2013/0129159 A1 | 5/2013 | Huijgens et al. |
| 2013/0152113 A1 | 6/2013 | Conrad et al. |
| 2013/0156273 A1 | 6/2013 | Nielsen |
| 2013/0205311 A1 | 8/2013 | Ramaswamy et al. |
| 2013/0205314 A1 | 8/2013 | Ramaswamy et al. |
| 2013/0259380 A1 | 10/2013 | Srinivasan et al. |
| 2013/0259381 A1 | 10/2013 | Srinivasan et al. |
| 2013/0298146 A1 | 11/2013 | Conrad et al. |
| 2013/0343614 A1 | 12/2013 | Kyal et al. |
| 2014/0108309 A1 | 4/2014 | Frank et al. |
| 2014/0130076 A1 | 5/2014 | Moore et al. |
| 2014/0161421 A1 | 6/2014 | Shoemaker et al. |
| 2014/0172579 A1 | 6/2014 | Peterson et al. |
| 2014/0189720 A1 | 7/2014 | Terrazas |
| 2014/0195221 A1 | 7/2014 | Frank et al. |
| 2014/0259034 A1 | 9/2014 | Terrazas |
| 2014/0278933 A1 | 9/2014 | McMillan |
| 2014/0282669 A1 | 9/2014 | McMillan |
| 2015/0086070 A1 | 3/2015 | Deng et al. |
| 2015/0271390 A1 | 9/2015 | Nielsen |
| 2016/0007083 A1 | 1/2016 | Gurha |
| 2016/0255384 A1 | 9/2016 | Marci et al. |
| 2016/0323640 A1 | 11/2016 | Terrazas |
| 2017/0142330 A1 | 5/2017 | Nielsen |
| 2018/0048807 A1 | 2/2018 | Nielsen |
| 2019/0058907 A1 | 2/2019 | Schenker et al. |
| 2019/0089894 A1 | 3/2019 | Nielsen |
| 2019/0164130 A1 | 5/2019 | Marci et al. |
| 2019/0182544 A1 | 6/2019 | Terrazas |
| 2019/0205656 A1 | 7/2019 | Srinivasan et al. |
| 2019/0222894 A1 | 7/2019 | Terrazas |
| 2019/0272554 A1 | 9/2019 | Cooper et al. |
| 2020/0134295 A1 | 4/2020 | el Kaliouby et al. |
| 2020/0351436 A1 | 11/2020 | Nielsen |
| 2021/0065117 A1 | 3/2021 | Marci et al. |
| 2021/0297738 A1 | 9/2021 | Terrazas |
| 2022/0256075 A1 | 8/2022 | Nielsen |
| 2022/0279246 A1 | 9/2022 | Terrazas |
| 2022/0279247 A1 | 9/2022 | Terrazas |
| 2022/0279248 A1 | 9/2022 | Terrazas |
| 2022/0286601 A1 | 9/2022 | Nielsen |

FOREIGN PATENT DOCUMENTS

| | | |
|---|---|---|
| WO | 2005041166 | 5/2005 |
| WO | 2005115011 | 12/2005 |
| WO | 2006099612 | 9/2006 |

OTHER PUBLICATIONS

United States Patent and Trademark Office, "Notice of Allowance," mailed in connection with U.S. Appl. No. 15/206,932, dated Aug. 8, 2018, 8 pages.

United States Patent and Trademark Office, "Final Office Action," mailed in connection with U.S. Appl. No. 15/206,932, dated Apr. 24, 2018, 14 pages.

United States Patent and Trademark Office, "Non-final Office Action," mailed in connection with U.S. Appl. No. 15/206,932, dated Dec. 14, 2017, 15 pages.

United States Patent and Trademark Office, "Notice of Allowance and Fee(s) Due," issued in connection with U.S. Appl. No. 16/209,635, dated Dec. 23, 2020, 8 pages.

United States Patent and Trademark Office, "Non-final Office Action," issued in connection with U.S. Appl. No. 16/209,635, dated Aug. 7, 2020, 14 pages.

United States Patent and Trademark Office, "Non-final Office Action," mailed in connection with U.S. Appl. No. 16/360,976, dated Oct. 1, 2020, 15 pages.

United States Patent and Trademark Office, "Notice of Allowance and Fee(s) Due," issued in connection with U.S. Appl. No. 16/360,976, dated Feb. 3, 2021, 8 pages.

United States Patent and Trademark Office, "Non-final Office Action," issued in connection with U.S. Appl. No. 17/341,104, dated Jul. 13, 2022, 16 pages.

United States Patent and Trademark Office, "Non-Final Office Action," issued in connection with U.S. Appl. No. 17/750,157, dated Sep. 19, 2022, 22 pages.

Wikipedia. (Dec. 2010) "Kinect." http://en.wikipedia.org/wiki/Kinect, 15 pages.

Fellers et al. (Aug. 2004) "Nikon MicroscopyU: Interactive Java Tutorials—CCD Signal-to-Noise Ratio." http://www.microscopyu.com/tutorials/java/digitalimaging/signaltonoise/index.html as archived by The Internet Archive, www.archive.org., 4 pages.

United States Patent and Trademark Office, "Non-Final Office Action," issued in connection with U.S. Appl. No. 13/327,227, dated May 20, 2014, 15 pages.

United States Patent and Trademark Office, "Final Office Action," issued in connection with U.S. Appl. No. 13/327,227, dated Sep. 18, 2014, 20 pages.

United States Patent and Trademark Office, "Notice of Allowance and Fee(s) Due," issued in connection with U.S. Appl. No. 13/327,227, dated Mar. 6, 2015, 9 pages.

United States Patent and Trademark Office, "Requirement for Restriction/Election," issued in connection with U.S. Appl. No. 14/732,175, dated Jul. 8, 2016, 6 pages.

United States Patent and Trademark Office, "Notice of Allowance and Fee(s) Due," issued in connection with U.S. Appl. No. 14/732,175, dated Sep. 23, 2016, 10 pages.

United States Patent and Trademark Office, "Notice of Allowance and Fee(s) Due," issued in connection with U.S. Appl. No. 15/419,120, dated Aug. 2, 2017, 10 pages.

United States Patent and Trademark Office, "Notice of Allowance and Fee(s) Due," issued in connection with U.S. Appl. No. 15/793,108, dated Aug. 23, 2018, 10 pages.

United States Patent and Trademark Office, "Non-Final Office action," issued in connection with U.S. Appl. No. 15/793,108, dated Mar. 2, 2018, 11 pages.

United States Patent and Trademark Office, "Advisory action," issued in connection with U.S. Appl. No. 16/196,810, dated May 13, 2020, 2 pages.

United States Patent and Trademark Office, "Final Office action," issued in connection with U.S. Appl. No. 16/196,810, dated Feb. 26, 2020, 23 pages.

United States Patent and Trademark Office, "Non-Final Office action," issued in connection with U.S. Appl. No. 16/196,810, dated Nov. 7, 2019, 15 pages.

United States Patent and Trademark Office, "Advisory action," issued in connection with U.S. Appl. No. 16/196,810, dated Aug. 22, 2019, 2 pages.

United States Patent and Trademark Office, "Final Office action," issued in connection with U.S. Appl. No. 16/196,810, dated Jun. 13, 2019, 16 pages.

(56) References Cited

OTHER PUBLICATIONS

United States Patent and Trademark Office, "Non-Final Office action," issued in connection with U.S. Appl. No. 16/196,810, dated Mar. 1, 2019, 14 pages.
United States Patent and Trademark Office, "Non-Final Office action," issued in connection with U.S. Appl. No. 16/878,935, dated Jun. 10, 2021, 9 pages.
United States Patent and Trademark Office, "Notice of Allowance and Fee(s) Due," issued in connection with U.S. Appl. No. 16/878,935, dated Sep. 27, 2021, 7 pages.
United States Patent and Trademark Office, "Notice of Allowance and Fee(s) Due," issued in connection with U.S. Appl. No. 17/751,283, dated Jul. 20, 2022, 8 pages.
Jia et al., "Extending the Feature Set for Facial Recognition," Apr. 7-9, 1992, 6 pages.
Turk et al., "Eigenfaces for Recognition," Journal of Cognitive Neuroscience, vol. 3, No. 1, 1991, 17 pages.
United States Patent and Trademark Office, "Notice of Allowance and Fee(s) Due," issued in connection with U.S. Appl. No. 17/666,322, dated Nov. 28, 2022, 7 pages.
*The Nielsen Company (US), LLC v. TVision Insights, Inc.*, "Answer to Complaint for Patent Infringement," filed with the United States District Court for the District of Delaware by TVision Insights, Inc., in connection with Case 1:22-cv-01345-CJB, Dec. 19, 2022, 16 pages.
United States Patent and Trademark Office, "Notice of Allowance and Fee(s) Due," issued in connection with U.S. Appl. No. 17/341,104, dated Jan. 9, 2023, 8 pages.
United States Patent and Trademark Office, "Notice of Allowability," issued in connection with U.S. Appl. No. 17/750,147, dated Feb. 13, 2023, 4 pages.
United States Patent and Trademark Office, "Notice of Allowability," issued in connection with U.S. Appl. No. 17/750,159, dated Feb. 13, 2023, 3 pages.
*The Nielsen Company (US), LLC v. TVision Insights, Inc.*, "Amended Answer to Complaint for Patent Infringement," filed with the United States District Court for the District of Delaware by TVision Insights, Inc., in connection with Case 1:22-cv-01345-CJB, Feb. 8, 2023, 34 pages.
Erik Larson, "Watching Americans Watch TV," The Atlantic Monthly, Mar. 1992, 12 pages.
U.S. Appl. No. 09/427,970, titled "Audio Signature Extraction and Correlation," filed with the United States Patent and Trademark Office on Oct. 27, 1999, 51 pages.
Teixeira et al., "A Survey of Human-Sensing: Methods for Detecting Presence, Count, Location, Track, and Identity," ENALAB Technical Report Sep. 2010, vol. 1, No. 1, Sep. 2010, 41 pages.
United States Patent and Trademark Office, "Non-final Office Action," issued in connection with U.S. Appl. No. 17/750,147, dated Mar. 15, 2023, 17 pages.
United States Patent and Trademark Office, "Non-final Office Action," issued in connection with U.S. Appl. No. 17/750,159, dated Mar. 15, 2023, 16 pages.
United States Patent and Trademark Office, "Notice of Allowance and Fee(s) Due," issued in connection with U.S. Appl. No. 17/666,322, dated Mar. 20, 2023, 8 pages.
United States Patent and Trademark Office, "Notice of Allowance and Fee(s) Due," issued in connection with U.S. Appl. No. 17/341,104, dated May 18, 2023, 8 pages.
United States Patent and Trademark Office, "Notice of Allowance and Fee(s) Due," issued in connection with U.S. Appl. No. 17/750,147, dated Dec. 14, 2022, 8 pages.
United States Patent and Trademark Office, "Notice of Allowance and Fee(s) Due," issued in connection with U.S. Appl. No. 17/750,159, dated Dec. 19, 2022, 9 pages.
United States Patent and Trademark Office, "Final Office Action," issued in connection with U.S. Appl. No. 17/750,157, dated Dec. 30, 2022, 22 pages.
United States Patent and Trademark Office, "Non-Final Office Action," issued in connection with U.S. Appl. No. 17/750,147, dated Aug. 16, 2022, 19 pages.
United States Patent and Trademark Office, "Non-Final Office Action," issued in connection with U.S. Appl. No. 17/750,159, dated Aug. 15, 2022, 11 pages.
Horovitz, Bruce, "Watching Ads Is Real Science Research Companies Monitor Physiological Reactions To Commercials To Determine Their Effectiveness," [3 Star Edition], Los Angeles Times, Orlando Sentinel, Sep. 1, 1991: D2, accessed on Mar. 25, 2013, 2 pages.
Hazlett et al., "Emotional Response to Television Commercials: Facial EMG vs. Self-Report," Journal of Advertising Research, (Apr. 1999), 17 pages.
Neurofocus—Neuroscientific Analysis for Audience Engagement, accessed on Jan. 8, 2010 at http://web.archive.org/web/20080621114525/www.neurofocus.com/BrandImage.htm, (2008), 2 pages.
Krugman, "Brain Wave Measures of Media Involvement," Journal of Advertising Research vol. 11, No. 1, pp. 3-9 (Feb. 1971), 7 pages.
Micu, A.C. et al., "Measurable Emotions: How Television Ads Really Work: How the Patterns of Reactions to Commercials can Demonstrate Advertising Effectiveness", Management Slant, 50(2), Jun. 2010; pp. 1-17, 18 pages.
United States Patent and Trademark Office, "Final Office Action," in connection with U.S. Appl. No. 17/750,147, dated Jun. 12, 2023, 21 pages.
United States Patent and Trademark Office, "Final Office Action," in connection with U.S. Appl. No. 17/750,159, dated Jun. 14, 2023, 18 pages.
United States Patent and Trademark Office, "Non-Final Office Action," in connection with U.S. Appl. No. 17/750,157, dated Jun. 14, 2023, 19 pages.
Ying-Li Tian, "Evaluation of Face Resolution for Expression Analysis," Proceedings of the 2004 IEEE Computer Society Conference on Computer Vision and Pattern Recognition Workshops (CVPRW'04), 2004, 7 pages.
*TVision Insights, Inc. v. The Nielsen Company (US), LLC*, "Petition for Inter Partes Review of U.S. Pat. No. 11,470,243," filed with the Patent Trial and Appeal Board of the United States Patent and Trademark Office by TVision Insights, Inc., in connection with IPR2023-01014 for U.S. Pat. No. 11,470,243, Jun. 16, 2023, 105 pages.
*The Nielsen Company (US), LLC v. TVision Insights, Inc.*, "Amended Answer to Complaint for Patent Infringement and CounterClaim of TVisision Insights, Inc. for Violation of Antitrust Laws, Tortious Interference and Unjust ENrichment," filed with the United States District Court of Delaware by TVision Insights, Inc., in connection with Case 1:22:cv-01345-CJIB, Oct. 13, 2023, 73 pages.
*The Nielsen Company (US), LLC v. TVision Insights, Inc.*, "Complaint for Patent Infringement," filed with the United States District Court for the District of Delaware by The Nielsen Company (US), LLC in connection with Case 1:22-cv-01345-CJB, Oct. 12, 2022, 21 pages.
*The Nielsen Company (US), LLC v. TVision Insights, Inc.*, "Exhibit A—Exhibit T," filed with the United States District Court for the District of Delaware by The Nielsen Company (US), LLC in connection with Case 1:22-cv-01345-CJB, Oct. 12, 2022, 240 pages.
Non-Final Office Action in U.S. Appl. No. 17/666,322, dated Oct. 18, 2023, 16 pages.
Non-Final Office Action in U.S. Appl. No. 17/750,147, dated Dec. 4, 2023, 19 pages.
Non-Final Office Action in U.S. Appl. No. 17/750,159, dated Dec. 13, 2023, 20 pages.
Patent Owner's Preliminary Response to Petition for IPR of U.S. Pat. No. 11,470,243, Case IPR2023-01014, Oct. 11, 2023, 73 pages.
Petitioner's Reply to Patent Owner's Preliminary Response, Case IPR2023-01014, Oct. 31, 2023, 8 pages.
Patent Owner's Sur-Reply to Petitioner's Reply to Preliminary Response, Case IPR2023-01014, Nov. 8, 2023, 10 pages.
Opposition of TVision Insights, Inc. to Plaintiff's Motion to Dismiss Defendant's Counterclaims, C.A. No. 22-1345-CJB, Dec. 19, 2023, 41 pages.

(56) References Cited

OTHER PUBLICATIONS

Decision Granting Institution of IPR of U.S. Pat. No. 11,470,243, Case IPR2023-01014, Jan. 8, 2024, 55 pages.

* cited by examiner ated Dec. 4, 2018, now U.S. Pat. No.
METHODS AND APPARATUS TO DETERMINE ENGAGEMENT LEVELS OF AUDIENCE MEMBERS

RELATED APPLICATIONS

This patent arises from a continuation of U.S. patent application Ser. No. 17/341,104, filed Jun. 7, 2021, now U.S. Pat. No. 11,700,421, which is a continuation Ser. No. 16/360,976, filed Mar. 21, 2019, now U.S. Pat. No. 11,032, 610, which is a continuation of U.S. patent application Ser. No. 16/209,635, filed Dec. 4, 2018, now U.S. Pat. No. 10,992,985, which is a continuation of U.S. patent application Ser. No. 15/206,932, filed Jul. 11, 2016, now U.S. Pat. No. 10,171,869, which is a continuation of U.S. patent application Ser. No. 14/281,139, filed May 19, 2014, now U.S. Pat. No. 9,407,958, which is a continuation of U.S. patent application Ser. No. 13/728,515, filed Dec. 27, 2012, now U.S. Pat. No. 8,769,557. Priority to U.S. patent application Ser. No. 13/728,515, U.S. patent application Ser. No. 14/281,139, U.S. patent application Ser. No. 15/206,932, U.S. patent application Ser. No. 16/209,635, U.S. patent application Ser. No. 16/360,976 and U.S. patent application Ser. No. 17/341,104 is claimed. U.S. patent application Ser. No. 13/728,515, U.S. patent application Ser. No. 14/281, 139, U.S. patent application Ser. No. 15/206,932, U.S. patent application Ser. No. 16/209,635, U.S. patent application Ser. No. 16/360,976 and U.S. patent application Ser. No. 17/341,104 are hereby incorporated herein by reference in their respective entireties.

FIELD OF THE DISCLOSURE

This patent relates generally to audience measurement and, more particularly, to methods and apparatus to determine engagement levels of audience members.

BACKGROUND

Audience measurement of media (e.g., broadcast television and/or radio, stored audio and/or video content played back from a memory such as a digital video recorder or a digital video disc, a webpage, audio and/or video media presented (e.g., streamed) via the Internet, a video game, etc.) often involves collection of media identifying data (e.g., signature(s), fingerprint(s), code(s), tuned channel identification information, time of exposure information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

In some audience measurement systems, the people data is collected by capturing a series of images of a media exposure environment (e.g., a television room, a family room, a living room, a bar, a restaurant, etc.) and analyzing the images to determine, for example, an identity of one or more persons present in the media exposure environment, an amount of people present in the media exposure environment during one or more times and/or periods of time, etc. The collected people data can be correlated with media identifying information corresponding to media detected as being presented in the media exposure environment to provide exposure data (e.g., ratings data) for that media.

DETAILED DESCRIPTION

Figure 1:
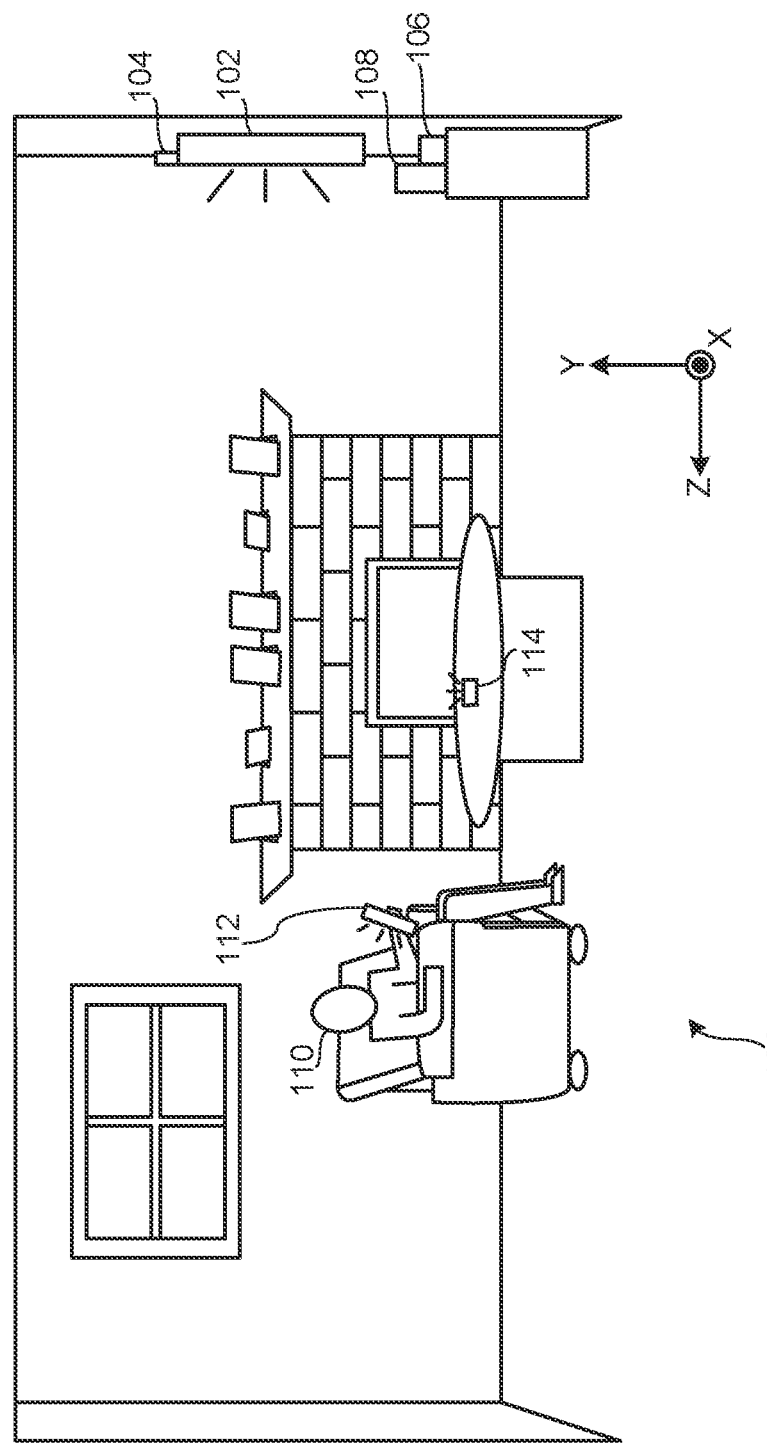
FIG. 1 is an illustration of an example exposure environment including an example audience measurement device constructed in accordance with the teachings of this disclosure.

In some audience measurement systems, people data is collected for a media exposure environment (e.g., a television room, a family room, a living room, a bar, a restaurant, an office space, a cafeteria, etc.) by capturing a series of images of the environment and analyzing the images to determine, for example, an identity of one or more persons present in the media exposure environment, an amount of people present in the media exposure environment during one or more times and/or periods of time, etc. The people data can be correlated with media identifying information corresponding to detected media to provide exposure data for that media. For example, an audience measurement entity (e.g., The Nielsen Company (US), LLC) can calculate ratings for a first piece of media (e.g., a television program) by correlating data collected from a plurality of panelist sites with the demographics of the panelist. For example, in each panelist site wherein the first piece of media is detected in the monitored environment at a first time, media identifying information for the first piece of media is correlated with presence information detected in the environment at the first time. The results from multiple panelist sites are combined and/or analyzed to provide ratings representative of exposure of a population as a whole.

Traditionally, such systems treat each detected person as present for purposes of calculating the exposure data (e.g., ratings) despite the fact that a first detected person may be paying little or no attention to the presentation of the media while a second detected person may be focused on (e.g., highly attentive too and/or interacting with) the presentation of the media.

Example methods, apparatus, and/or articles of manufacture disclosed herein recognize that although a person may be detected as present in the media exposure environment, the presence of the person does not necessarily mean that the person is paying attention to (e.g., is engaged with) a certain media presentation device. For example, an audience measurement device deployed in a living room may detect a person sitting on a couch in front of a television. According to previous systems, the person detected in front of the television is determined to be engaged with the television and, thus, the media being presented by the television.

Examples disclosed herein recognize that although the person is sitting in front of the television, the person may be engaged with a different media device such as, for example, a tablet, a laptop computer, a mobile phone, or a desktop computer. Examples disclosed herein recognize that such a person (e.g., a person interacting with a tablet, a laptop computer, a mobile phone, a desktop computer, etc.) is not engaged with the television or at least less engaged with the television than someone not interacting with a different media device (other than the television). For example, the person may be browsing the Internet on a tablet rather than watching a movie being presented by the television. Alternatively, the person may be writing a text message on a mobile phone rather than watching a television program being presented by the television. Alternatively, the person may be browsing the Internet on a laptop computer rather than watching an on-demand program being presented by the television. In such instances, the television is referred to herein as a primary media device and the tablet, mobile phone, and/or laptop computer are referred to herein as secondary media device(s). While the above example refers to a television as a primary media device, examples disclosed herein can be utilized with additional or alternative types of media presentation devices serving as the primary media device and/or the secondary media device.

To identify such interactions with secondary media devices, examples disclosed herein monitor the environment for light patterns associated with a projection of light generated by certain media presentation devices. In some examples disclosed herein, image data (e.g., a portion of an image corresponding to a detected face of a person) captured of the media exposure environment is compared to light signatures known to correspond to light signature projected onto a body part of a person (e.g., a face of a person) generated by a display in close proximity (e.g., within three feet) to the person. When examples disclosed herein determine that a detected light pattern in the environment resembles one of the light signatures known to correspond to a projection of light from a secondary media device onto an object (e.g., a face), examples disclosed herein determine that the person is (or at least likely is) interacting with the secondary media device (e.g., a tablet, a mobile phone, a laptop computer, a desktop computer, etc.) and, thus, is paying a reduced amount of attention to the primary media device (e.g., a television).

Examples disclosed herein also recognize that a mere presence of a secondary media device in a monitored environment may be indicative of a reduced engagement with the primary media device. For example, presence of a laptop computer in an environment including a television as the primary media device may distract a person from the television (e.g., due to music, video, and/or images being displayed by the laptop computer). Accordingly, in addition to or lieu of the light pattern detection described above, examples disclosed herein detect a glow emanating from secondary media devices such as, for example, a tablet, a mobile phone, a laptop computer, a desktop computer, etc. Examples disclosed herein determine that a secondary media device is present based on such a detected glow. In some instances, to determine whether a person detected in the environment is interacting with the secondary media device associated with the detected glow, examples disclosed herein measure a proximity of the detected to glow to the person.

Examples disclosed herein utilize detections of interactions with secondary media device(s) and/or presence of secondary media device(s) to measure attentiveness of the audience member(s) with respect to the primary media device. An example measure of attentiveness for an audience member provided by examples disclosed herein is referred to herein as an engagement level. In some examples disclosed herein, individual engagement levels of separate audience members (who may be physically located at a same specific exposure environment and/or at multiple different exposure environments) are combined, aggregated, statistically adjusted, and/or extrapolated to formulate a collective engagement level for an audience at one or more physical locations. In some examples, a person specific engagement level for each audience member with respect to particular media is calculated in real time (e.g., virtually simultaneously with) as the primary media device presents the particular media.

Additionally or alternatively, examples disclosed herein use the analysis of the light patterns detected in the monitored environment to identify a type of the secondary media device being used. For example, depending on which of the known light signatures matches the detected light pattern in the environment, examples disclosed herein may identify the type of the secondary media device as a tablet or a mobile telephone. Additionally or alternatively, examples disclosed herein use the analysis of the light patterns detected in the monitored environment to identify the secondary media device being used by, for example, brand name, model number, generation, etc. For example, depending on which one of the known light signatures matches the detected light pattern in the environment, examples disclosed herein may identify the secondary media device as corresponding to a particular manufacturer (e.g., an Apple® product) or even as corresponding to a particular product (e.g., an Apple® iPhone®, an Apple® iPhone5®, a Samsung® product, a Samsung® Galaxy S3®, etc.)

FIG. 1 is an illustration of an example media exposure environment 100 including an information presentation device 102, a multimodal sensor 104, and a meter 106 for collecting audience measurement data. In the illustrated example of FIG. 1, the media exposure environment 100 is a room of a household (e.g., a room in a home of a panelist such as the home of a "Nielsen family") that has been statistically selected to develop television ratings data for a population/demographic of interest. In the illustrated example, one or more persons of the household have registered with an audience measurement entity (e.g., by agreeing to be a panelist) and have provided their demographic information to the audience measurement entity as part of a registration process to enable associating demographics with viewing activities (e.g., media exposure).

In some examples, the audience measurement entity provides the multimodal sensor 104 to the household. In some examples, the multimodal sensor 104 is a component of a media presentation system purchased by the household such as, for example, a camera of a video game system 108 (e.g., Microsoft® Kinect®) and/or piece(s) of equipment associated with a video game system (e.g., a Kinect® sensor). In such examples, the multimodal sensor 104 may be repurposed and/or data collected by the multimodal sensor 104 may be repurposed for audience measurement.

In the illustrated example of FIG. 1, the multimodal sensor 104 is placed above the information presentation device 102 at a position for capturing image and/or audio data of the environment 100. In some examples, the multimodal sensor 104 is positioned beneath or to a side of the information presentation device 102 (e.g., a television or other display). In the illustrated example of FIG. 1, the example information presentation device 102 is referred to as a primary media device because the multimodal sensor 104 is configured to monitor the environment 100 relative to the information presentation device 102. The example environment 100 of FIG. 1 also includes a first secondary media device 112 with which an audience member 110 is interacting and a second secondary media device 114 resting on a table. As described below, the example meter 106 of FIG. 1 is capable of (1) detecting usage of the first secondary media device 112 by the audience member 110, (2) identifying a type of the first secondary media device 112 with which the audience member is interacting (e.g., a tablet, phone, etc.), (3) identifying the first secondary media device 112 itself (e.g., manufacturer, model, etc.), (4) detecting a glow associated with the second secondary media device 114, and/or (5) factoring the detected interaction, type, and/or identity of the first secondary media device 112 and/or the presence of the second secondary media device 114 into an engagement level calculation for the audience member 110 with respect to the primary media device 102. In other words, the example meter 106 of FIG. 1 determines whether the audience member 110 is interacting with and/or is likely to be interacting with the first secondary media device 112 and/or the second secondary media device 114 and considers such determinations when measuring a level of engagement of the audience member 110 with the primary media device 102. In some examples, the meter 106 of FIG. 1 uses the detected interaction with the secondary media device(s) 112, 114 to increase or decrease an already calculated engagement level for the audience member 110. In some examples, the example meter 106 of FIG. 1 calculates an engagement level of the audience member 110 with the primary media device 102 based solely on the detected (or not detected) interaction with the secondary media device(s) 112, 114. The example detection of secondary media device usage and the engagement calculations disclosed herein are described in detail below in connection with FIGS. 5-7.

In some examples, the multimodal sensor 104 is integrated with the video game system 108. For example, the multimodal sensor 104 may collect image data (e.g., three-dimensional data and/or two-dimensional data) using one or more sensors for use with the video game system 108 and/or may also collect such image data for use by the meter 106. In some examples, the multimodal sensor 104 employs a first type of image sensor (e.g., a two-dimensional sensor) to obtain image data of a first type (e.g., two-dimensional data) and collects a second type of image data (e.g., three-dimensional data) from a second type of image sensor (e.g., a three-dimensional sensor). In some examples, only one type of sensor is provided by the video game system 108 and a second sensor is added by the audience measurement system.

In the example of FIG. 1, the meter 106 is a software meter provided for collecting and/or analyzing the data from, for example, the multimodal sensor 104 and other media identification data collected as explained below. In some examples, the meter 106 is installed in the video game system 108 (e.g., by being downloaded to the same from a network, by being installed at the time of manufacture, by being installed via a port (e.g., a universal serial bus (USB) from a jump drive provided by the audience measurement company, by being installed from a storage disc (e.g., an optical disc such as a BluRay disc, Digital Versatile Disc (DVD) or CD (compact Disk), or by some other installation approach). Executing the meter 106 on the panelist's equipment is advantageous in that it reduces the costs of installation by relieving the audience measurement entity of the need to supply hardware to the monitored household). In other examples, rather than installing the software meter 106 on the panelist's consumer electronics, the meter 106 is a dedicated audience measurement unit provided by the audience measurement entity. In such examples, the meter 106 may include its own housing, processor, memory and software to perform the desired audience measurement functions. In such examples, the meter 106 is adapted to communicate with the multimodal sensor 104 via a wired or wireless connection. In some such examples, the communications are affected via the panelist's consumer electronics (e.g., via a video game console). In other example, the multimodal sensor 104 is dedicated to audience measurement and, thus, no interaction with the consumer electronics owned by the panelist is involved.

The example audience measurement system of FIG. 1 can be implemented in additional and/or alternative types of environments such as, for example, a room in a non-statistically selected household, a theater, a restaurant, a tavern, a retail location, an arena, etc. For example, the environment may not be associated with a panelist of an audience measurement study, but instead may simply be an environment associated with a purchased XBOX® and/or Kinect® system. In some examples, the example audience measurement system of FIG. 1 is implemented, at least in part, in connection with additional and/or alternative types of media presentation devices such as, for example, a radio, a computer, a tablet, a cellular telephone, and/or any other communication device able to present media to one or more individuals.

In the illustrated example of FIG. 1, the primary media device 102 (e.g., a television) is coupled to a set-top box (STB) that implements a digital video recorder (DVR) and a digital versatile disc (DVD) player. Alternatively, the DVR and/or DVD player may be separate from the STB. In some examples, the meter 106 of FIG. 1 is installed (e.g., downloaded to and executed on) and/or otherwise integrated with the STB. Moreover, the example meter 106 of FIG. 1 can be implemented in connection with additional and/or alternative types of media presentation devices such as, for example, a radio, a computer monitor, a video game console and/or any other communication device able to present content to one or more individuals via any past, present or future device(s), medium(s), and/or protocol(s) (e.g., broadcast television, analog television, digital television, satellite broadcast, Internet, cable, etc.).

As described in detail below, the example meter 106 of FIG. 1 utilizes the multimodal sensor 104 to capture a plurality of time stamped frames of image data, depth data, and/or audio data from the environment 100. In example of FIG. 1, the multimodal sensor 104 of FIG. 1 is part of the video game system 108 (e.g., Microsoft® XBOX®, Microsoft® Kinect®). However, the example multimodal sensor 104 can be associated and/or integrated with the STB, associated and/or integrated with the primary media device 102, associated and/or integrated with a BlueRay® player located in the environment 100, or can be a standalone device (e.g., a Kinect® sensor bar, a dedicated audience measurement meter, etc.), and/or otherwise implemented. In some examples, the meter 106 is integrated in the STB or is a separate standalone device and the multimodal sensor 104 is the Kinect® sensor or another sensing device. The example multimodal sensor 104 of FIG. 1 captures images within a fixed and/or dynamic field of view. To capture depth data, the example multimodal sensor 104 of FIG. 1 uses a laser or a laser array to project a dot pattern onto the environment 100. Depth data collected by the multimodal sensor 104 can be interpreted and/or processed based on the dot pattern and how the dot pattern lays onto objects of the environment 100. In the illustrated example of FIG. 1, the multimodal sensor 104 also captures two-dimensional image data via one or more cameras (e.g., infrared sensors) capturing images of the environment 100. In the illustrated example of FIG. 1, the multimodal sensor 104 also captures audio data via, for example, a directional microphone. As described in greater detail below, the example multimodal sensor 104 of FIG. 1 is capable of detecting some or all of eye position(s) and/or movement(s), skeletal profile(s), pose(s), posture(s), body position(s), person identit(ies), body type(s), etc. of the individual audience members. In some examples, the data detected via the multimodal sensor 104 is used to, for example, detect and/or react to a gesture, action, or movement taken by the corresponding audience member. The example multimodal sensor 104 of FIG. 1 is described in greater detail below in connection with FIG. 2.

As described in detail below in connection with FIG. 2, the example meter 106 of FIG. 1 monitors the environment 100 to identify media being presented (e.g., displayed, played, etc.) by the primary media device 102 and/or other media presentation devices to which the audience is exposed (e.g., the secondary media device(s) 112, 114). In some examples, identification(s) of media to which the audience is exposed are correlated with the presence information collected by the multimodal sensor 104 to generate exposure data for the media. In some examples, identification(s) of media to which the audience is exposed are correlated with behavior data (e.g., engagement levels) collected by the multimodal sensor 104 to additionally or alternatively generate engagement ratings for the media presented by, for example, the primary media device 102.

Figure 2:
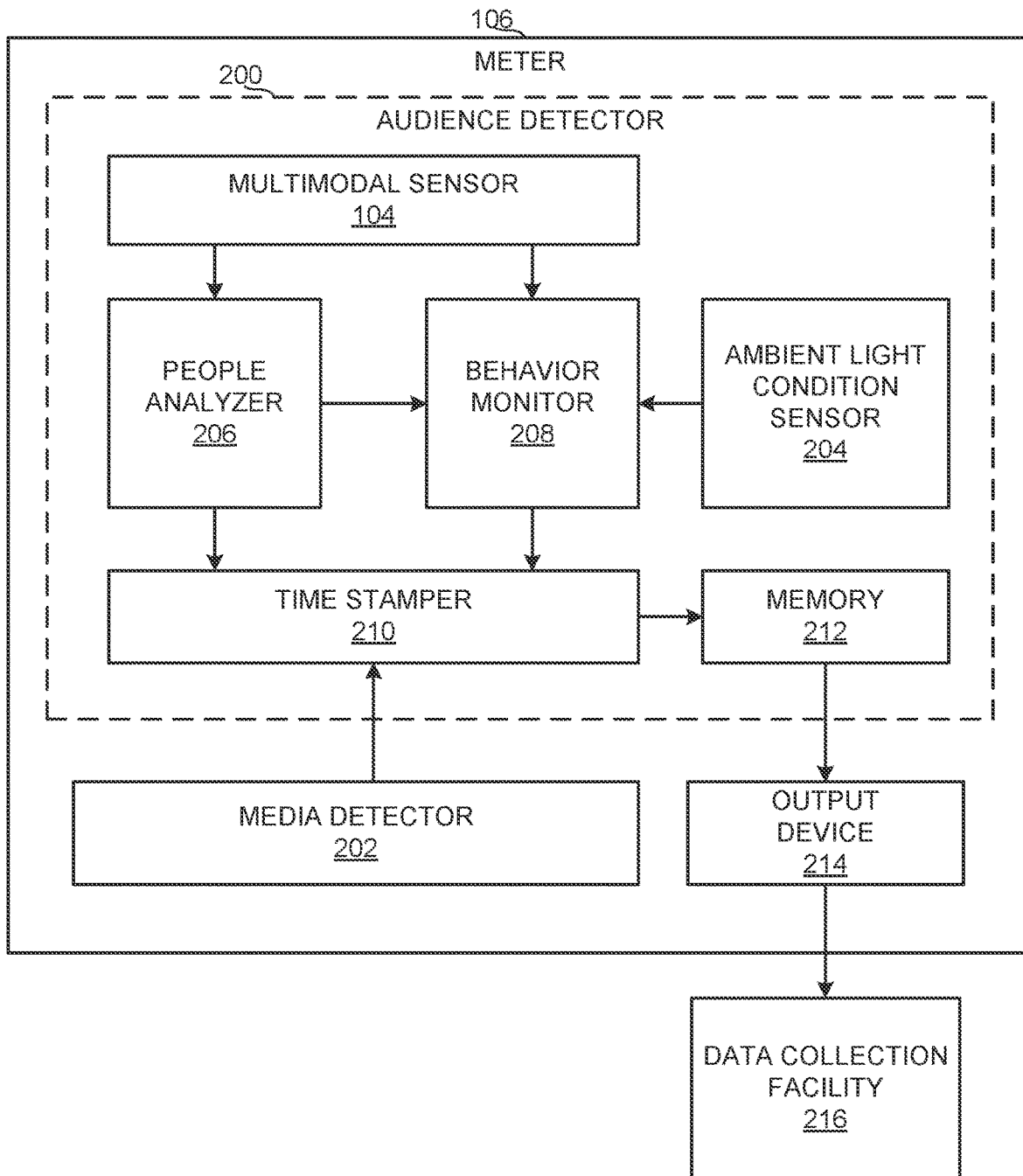
FIG. 2 is a block diagram of an example implementation of the example audience measurement device of FIG. 1.

FIG. 2 is a block diagram of an example implementation of the example meter 106 of FIG. 1. The example meter 106 of FIG. 2 includes an audience detector 200 to develop audience composition information regarding, for example, the audience member 110 of FIG. 1. The example meter 106 of FIG. 2 also includes a media detector 202 to collect media information regarding, for example, media presented in the environment 100 of FIG. 1. The example multimodal sensor 104 of FIG. 2 includes a three-dimensional sensor and a two-dimensional sensor. The example meter 106 may additionally or alternatively receive three-dimensional data and/or two-dimensional data representative of the environment 100 from different source(s). For example, the meter 106 may receive three-dimensional data from the multimodal sensor 104 and two-dimensional data from a different component. Alternatively, the meter 106 may receive two-dimensional data from the multimodal sensor 104 and three-dimensional data from a different component.

In some examples, to capture three-dimensional data, the multimodal sensor 104 projects an array or grid of dots (e.g., via one or more lasers) onto objects of the environment 100. The dots of the array projected by the example multimodal sensor 104 have respective x-axis coordinates and y-axis coordinates and/or some derivation thereof. The example multimodal sensor 104 of FIG. 2 uses feedback received in connection with the dot array to calculate depth values associated with different dots projected onto the environment 100. Thus, the example multimodal sensor 104 generates a plurality of data points. Each such data point has a first component representative of an x-axis position in the environment 100, a second component representative of a y-axis position in the environment 100, and a third component representative of a z-axis position in the environment 100. As used herein, the x-axis position of an object is referred to as a horizontal position, the y-axis position of the object is referred to as a vertical position, and the z-axis position of the object is referred to as a depth position relative to the multimodal sensor 104. The example multimodal sensor 104 of FIG. 2 may utilize additional or alternative type(s) of three-dimensional sensor(s) to capture three-dimensional data representative of the environment 100.

While the example multimodal sensor 104 implements a laser to projects the plurality grid points onto the environment 100 to capture three-dimensional data, the example multimodal sensor 104 of FIG. 2 also implements an image capturing device, such as a camera, that captures two-dimensional image data representative of the environment 100. In some examples, the image capturing device includes an infrared imager and/or a charge coupled device (CCD) camera. In some examples, the multimodal sensor 104 only captures data when the primary media device 102 is in an "on" state and/or when the media detector 202 determines that media is being presented in the environment 100 of FIG. 1. The example multimodal sensor 104 of FIG. 2 may also include one or more additional sensors to capture additional or alternative types of data associated with the environment 100.

Further, the example multimodal sensor 104 of FIG. 2 includes a directional microphone array capable of detecting audio in certain patterns or directions in the media exposure environment 100. In some examples, the multimodal sensor 104 is implemented at least in part by a Microsoft® Kinect® sensor.

The example audience detector 200 of FIG. 2 includes an ambient light condition sensor 204 to identify a lighting condition associated with the example environment 100. The example ambient light condition sensor 204 is implemented by, for example, one or more photo cells capable of detecting an amount of light present in the environment 100 and/or other light-based characteristics of the environment 100. In some examples, the ambient light condition sensor 204 of FIG. 2 additionally or alternatively implements a timer to determine a time of day. The example ambient light condition sensor 204 uses the determined time of day to, for example, attribute the detected amount of light to daylight and/or artificial light (e.g., light from a lamp). Additionally or alternatively, the example ambient light condition sensor 204 implements a first sensor to detect an amount of natural light (e.g., daylight) and a second sensor to detect an amount of artificial light (e.g., light generated by a light bulb). As described in greater detail below in connection with FIG. 5, the lighting characteristics of the environment 100 captured by the ambient light condition sensor 204 are used to select one of a plurality of sets of light signatures for an analysis of the environment 100. Different ones of the light signatures correspond to different lighting conditions and, thus, the ambient light condition sensor 204 enables selection of the appropriate set of light signatures for the analysis of the environment 100.

The example audience detector 200 of FIG. 2 includes a people analyzer 206, a behavior monitor 208, a time stamper 210, and a memory 212. In the illustrated example of FIG. 2, data obtained by the multimodal sensor 104 of FIG. 2, such as depth data, two-dimensional image data, and/or audio data is conveyed to the people analyzer 206. The example people analyzer 206 of FIG. 2 generates a people count or tally representative of a number of people in the environment 100 for a frame of captured image data. The rate at which the example people analyzer 206 generates people counts is configurable. In the illustrated example of FIG. 2, the example people analyzer 206 instructs the example multimodal sensor 104 to capture data (e.g., three-dimensional and/or two-dimensional data) representative of the environment 100 every five seconds. However, the example people analyzer 206 can receive and/or analyze data at any suitable rate.

The example people analyzer 206 of FIG. 2 determines how many people appear in a frame in any suitable manner using any suitable technique. For example, the people analyzer 206 of FIG. 2 recognizes a general shape of a human body and/or a human body part, such as a head and/or torso. Additionally or alternatively, the example people analyzer 206 of FIG. 2 may count a number of "blobs" that appear in the frame and count each distinct blob as a person. Recognizing human shapes and counting "blobs" are illustrative examples and the people analyzer 206 of FIG. 2 can count people using any number of additional and/or alternative techniques. An example manner of counting people is described by Ramaswamy et al. in U.S. patent application Ser. No. 10/538,483, filed on Dec. 11, 2002, now U.S. Pat. No. 7,203,338, which is hereby incorporated herein by reference in its entirety.

Figure 3:
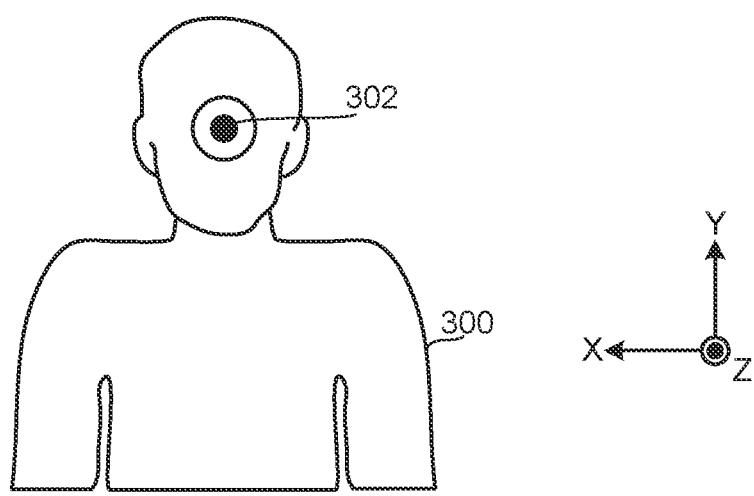
FIG. 3 is an illustration of an example person tracked by the example face detector of FIG. 2.

In the illustrated example of FIG. 2, the people analyzer 206 tracks a position of each detected person in the environment 100 of FIG. 1. In particular, the example people analyzer 206 of FIG. 2 generates a coordinate (e.g., an X-Y coordinate or an X-Y-Z coordinate) for each detected person. FIG. 3 illustrates a detected person 300 and a coordinate 302 generated by the example people analyzer 206 to track a position of the person 300. The example person 300 of FIG. 3 may correspond to the audience member 110 of FIG. 1. In some examples, the example coordinate 302 of FIG. 3 and/or any other suitable position tracking data generated by, for example, the people analyzer 206 is utilized by the behavior monitor 208. For example, as described below, the example behavior monitor 208 uses the coordinate 302 of FIG. 3 to focus an analysis of image data on an area of the environment 100 known to include the person 300 (as identified by the people analyzer 206).

Additionally, the example people analyzer 206 of FIG. 2 executes a facial recognition procedure such that people captured in the frames can be individually identified. In some examples, the audience detector 200 may have additional or alternative methods and/or components to identify people in the frames. For example, the audience detector 200 of FIG. 2 can implement a feedback system to which the members of the audience provide (e.g., actively and/or passively) identification to the meter 106. To identify people in the frames, the example people analyzer 206 includes or has access to a collection (e.g., stored in a database) of facial signatures (e.g., image vectors). Each facial signature of the illustrated example corresponds to a person having a known identity to the people analyzer 206. The collection includes an identifier (ID) for each known facial signature that corresponds to a known person. For example, in reference to FIG. 1, the collection of facial signatures may correspond to frequent visitors and/or members of the household associated with the room 100. The example people analyzer 206 of FIG. 2 analyzes one or more regions of a frame thought to correspond to a human face and develops a pattern or map for the region(s) (e.g., using the depth data provided by the multimodal sensor 104). The pattern or map of the region represents a facial signature of the detected human face. In some examples, the pattern or map is mathematically represented by one or more vectors. The example people analyzer 206 of FIG. 2 compares the detected facial signature to entries of the facial signature collection. When a match is found, the example people analyzer 206 has suc-cessfully identified at least one person in the frame. In such instances, the example people analyzer 206 of FIG. 2 records (e.g., in a memory address accessible to the people analyzer 206) the ID associated with the matching facial signature of the collection. When a match is not found, the example people analyzer 206 of FIG. 2 retries the comparison or prompts the audience for information that can be added to the collection of known facial signatures for the unmatched face. More than one signature may correspond to the same face (i.e., the face of the same person). For example, a person may have one facial signature when wearing glasses and another when not wearing glasses. A person may have one facial signature with a beard, and another when cleanly shaven.

Each entry of the collection of known people used by the example people analyzer 206 of FIG. 2 also includes a type for the corresponding known person. For example, the entries of the collection may indicate that a first known person is a child of a certain age and/or age range and that a second known person is an adult of a certain age and/or age range. In instances in which the example people analyzer 206 of FIG. 2 is unable to determine a specific identity of a detected person, the example people analyzer 206 of FIG. 2 estimates a type for the unrecognized person(s) detected in the exposure environment 100. For example, the people analyzer 206 of FIG. 2 estimates that a first unrecognized person is a child, that a second unrecognized person is an adult, and that a third unrecognized person is a teenager. The example people analyzer 206 of FIG. 2 bases these estimations on any suitable factor(s) such as, for example, height, head size, body proportion(s), etc.

In the illustrated example, data obtained by the multimodal sensor 104 of FIG. 2 is conveyed to the behavior monitor 208. As described in detail below in connection with FIGS. 4-7, the data conveyed to the example behavior monitor 208 of FIG. 2 is used by examples disclosed herein to identify behavior(s) and/or generate engagement level(s) for people appearing in the environment 100 with respect to, for example, the primary media device 102. For example, the image data captured by the multimodal sensor 104 is analyzed to determine whether a light signature known to correspond to use of a secondary media device (e.g., the secondary media device 112 of FIG. 1) appears in the image data. That is, the example behavior monitor 208 of FIG. 2 determines whether the audience member 110 is interacting with the secondary media device 112 based on the detected light pattern, thereby indicating disengagement (e.g., no attention or a reduced amount of attention paid) from the primary media device 102 of FIG. 1. In some examples, the example behavior monitor 208 of FIG. 2 uses the detection of the interaction with the secondary media device 112 to calculate an engagement level for the audience member 110 with respect to the primary media device 102. In some examples, if the detected light pattern corresponds to a light signature known to correspond to a particular media device (e.g., a particular brand and/or model of device) and/or a particular type of media device (e.g., a tablet, a mobile telephone, a laptop computer, a desktop computer, etc.), the example behavior monitor 208 of FIG. 2 determines that the particular media device and/or the particular type of media device is being used in the environment 100. In some examples, the behavior monitor 208 of FIG. 2 determines whether a secondary media device (e.g., the first and/or second secondary media devices 112, 114) are present in the environment based on the detected light pattern and/or based a detected glow emanating from the secondary media device(s). The example behavior monitor 208 is described in detail below in connection with FIGS. 4-7.

The example people analyzer 206 of FIG. 2 outputs the calculated tallies, identification information, person type estimations for unrecognized person(s), and/or corresponding image frames to the time stamper 210. Similarly, the example behavior monitor 208 outputs data (e.g., calculated behavior(s), engagement level(s), media selection(s), media device identifier(s), etc.) to the time stamper 210. The time stamper 210 of the illustrated example includes a clock and a calendar. The example time stamper 210 associates a time period (e.g., 1:00a.m. Central Standard Time (CST) to 1:01 a.m. CST) and date (e.g., Jan. 1, 2012) with each calculated people count, identifier, frame, behavior, engagement level, media selection, etc., by, for example, appending the period of time and data information to an end of the data. A data package (e.g., the people count(s), the time stamp(s), the media identifier(s), the date and time, the engagement level(s), the behavior data, the media device identifier(s), the image data, etc.) is stored in the memory 212.

The memory 212 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The memory 212 may include one or more double data rate (DDR) memories, such as DDR, DDR2, DDR3, mobile DDR (mDDR), etc. The memory 212 may additionally or alternatively include one or more mass storage devices such as, for example, hard drive disk(s), compact disk drive(s), digital versatile disk drive(s), etc. When the example meter 106 is integrated into, for example the video game system 108 of FIG. 1, the meter 106 may utilize memory of the video game system 108 to store information such as, for example, the people counts, the image data, the engagement levels, etc.

The example time stamper 210 of FIG. 2 also receives data from the example media detector 202. The example media detector 202 of FIG. 2 detects presentation(s) of media in the media exposure environment 100 and/or collects identification information associated with the detected presentation(s). For example, the media detector 202, which may be in wired and/or wireless communication with the presentation device (e.g., television) 102, the multimodal sensor 104, the video game system 108, the STB 110, and/or any other component(s) of FIG. 1, can identify a presentation time and a source of a presentation. The presentation time and the source identification data may be utilized to identify the program by, for example, cross-referencing a program guide configured, for example, as a look up table. In such instances, the source identification data may be, for example, the identity of a channel (e.g., obtained by monitoring a tuner of the STB of FIG. 1 or a digital selection made via a remote control signal) currently being presented on the information presentation device 102.

Additionally or alternatively, the example media detector 202 can identify the presentation by detecting codes (e.g., watermarks) embedded with or otherwise conveyed (e.g., broadcast) with media being presented via the STB and/or the primary media device 102. As used herein, a code is an identifier that is transmitted with the media for the purpose of identifying and/or for tuning to (e.g., via a packet identifier header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example, the media detector 202 extracts the codes from the media. In some examples, the media detector 202 may collect samples of the media and export the samples to a remote site for detection of the code(s).

Additionally or alternatively, the media detector 202 can collect a signature representative of a portion of the media. As used herein, a signature is a representation of some characteristic of signal(s) carrying or representing one or more aspects of the media (e.g., a frequency spectrum of an audio signal). Signatures may be thought of as fingerprints of the media. Collected signature(s) can be compared against a collection of reference signatures of known media to identify the tuned media. In some examples, the signature(s) are generated by the media detector 202. Additionally or alternatively, the media detector 202 may collect samples of the media and export the samples to a remote site for generation of the signature(s). In the example of FIG. 2, irrespective of the manner in which the media of the presentation is identified (e.g., based on tuning data, metadata, codes, watermarks, and/or signatures), the media identification information is time stamped by the time stamper 210 and stored in the memory 212.

In the illustrated example of FIG. 2, the output device 214 periodically and/or aperiodically exports data (e.g., media identification information, audience identification information, etc.) from the memory 214 to a data collection facility 216 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the example meter 106 utilizes the communication abilities (e.g., network connections) of the video game system 108 to convey information to, for example, the data collection facility 216. In the illustrated example of FIG. 2, the data collection facility 216 is managed and/or owned by an audience measurement entity (e.g., The Nielsen Company (US), LLC). The audience measurement entity associated with the example data collection facility 216 of FIG. 2 utilizes the people tallies generated by the people analyzer 206 and/or the personal identifiers generated by the people analyzer 206 in conjunction with the media identifying data collected by the media detector 202 to generate exposure information. The information from many panelist locations may be compiled and analyzed to generate ratings representative of media exposure by one or more populations of interest.

In some examples, the data collection facility 216 employs analyzes the behavior/engagement level information generated by the example behavior monitor 208 to, for example, generate engagement level ratings for media identified by the media detector 202. In some examples, the engagement level ratings are used to determine whether a retroactive fee is due to a service provider from an advertiser due to a certain engagement level existing at a time of presentation of content of the advertiser.

Alternatively, analysis of the data (e.g., data generated by the people analyzer 206, the behavior monitor 208, and/or the media detector 202) may be performed locally (e.g., by the example meter 106 of FIG. 2) and exported via a network or the like to a data collection facility (e.g., the example data collection facility 216 of FIG. 2) for further processing. For example, the amount of people (e.g., as counted by the example people analyzer 206) and/or engagement level(s) (e.g., as calculated by the example behavior monitor 208) in the exposure environment 100 at a time (e.g., as indicated by the time stamper 210) in which a sporting event (e.g., as identified by the media detector 202) was presented by the primary media device 102 can be used in a exposure calculation and/or engagement calculation for the sporting event. In some examples, additional information (e.g., demographic data associated with one or more people identified by the people analyzer 206, geographic data, etc.) is correlated with the exposure information and/or the engagement information by the audience measurement entity associated with the data collection facility 216 to expand the usefulness of the data collected by the example meter 106 of FIGS. 1 and/or 2. The example data collection facility 216 of the illustrated example compiles data from a plurality of monitored exposure environments (e.g., other households, sports arenas, bars, restaurants, amusement parks, transportation environments, retail locations, etc.) and analyzes the data to generate exposure ratings and/or engagement ratings for geographic areas and/or demographic sets of interest.

While an example manner of implementing the meter 106 of FIG. 1 has been illustrated in FIG. 2, one or more of the elements, processes and/or devices illustrated in FIG. 2 may be combined, divided, re-arranged, omitted, eliminated and/or implemented in any other way. Further, the example audience detector 200, the example media detector 202, the example people analyzer 206, the example behavior monitor 208, the example time stamper 210, the example output device 214 and/or, more generally, the example meter 106 of FIG. 2 may be implemented by hardware, software, firmware and/or any combination of hardware, software and/or firmware. Thus, for example, any of the example audience detector 200, the example media detector 202, the example people analyzer 206, the behavior monitor 208, the example time stamper 210, the example output device 214 and/or, more generally, the example meter 106 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example audience detector 200, the example media detector 202, the example people analyzer 206, the behavior monitor 208, the example time stamper 210, the example output device 214 and/or, more generally, the example meter 106 of FIG. 2 are hereby expressly defined to include a tangible computer readable storage medium such as a storage device (e.g., a memory) or an optical storage disc (e.g., a DVD, a CD, a Bluray disc) storing the software and/or firmware. Further still, the example meter 106 of FIG. 2 may include one or more elements, processes and/or devices in addition to, or instead of, those illustrated in FIG. 2, and/or may include more than one of any or all of the illustrated elements, processes and devices.

Figure 4:
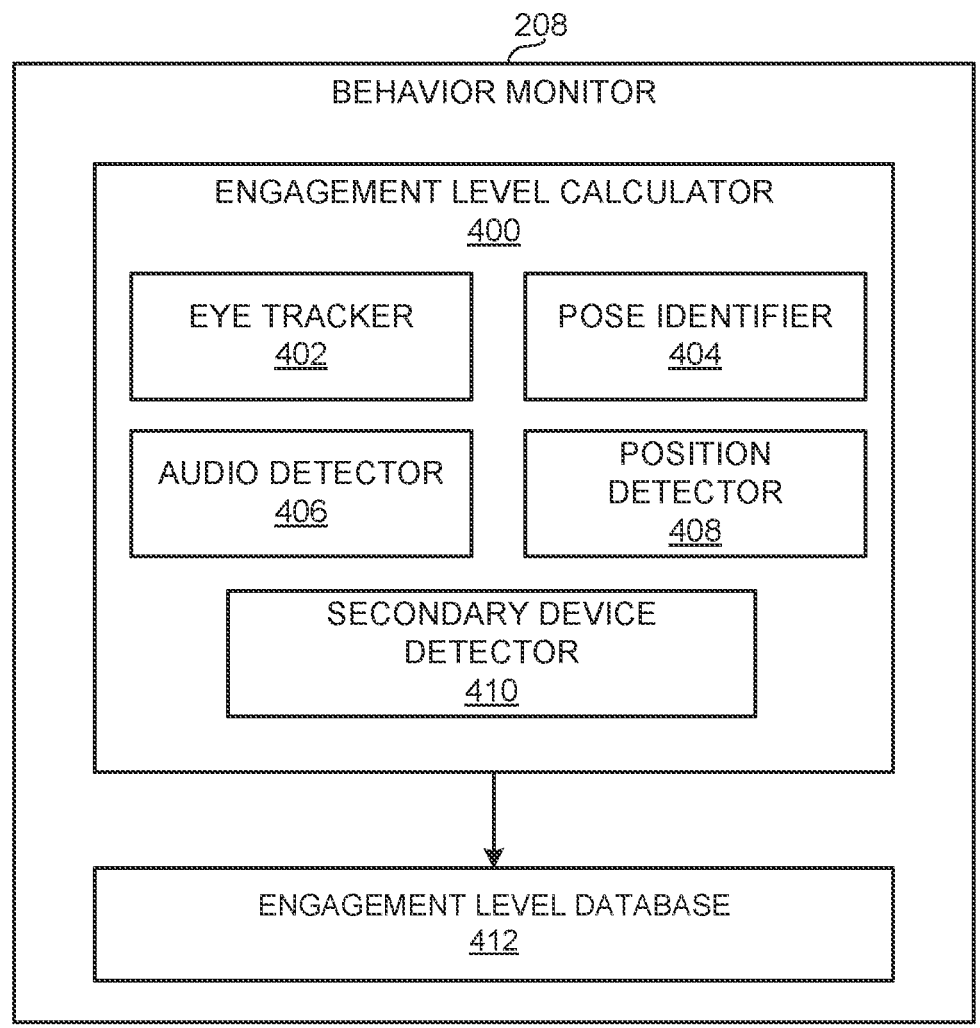
FIG. 4 is a block diagram of an example implementation of the example behavior monitor of FIG. 2.

FIG. 4 is a block diagram of an example implementation of the example behavior monitor 208 of FIG. 2. As described above in connection with FIG. 2, the example behavior monitor 208 of FIG. 4 receives data from the multimodal sensor 104 and coordinate information associated with a detected person from the example people analyzer 206 of FIG. 2. The example behavior monitor 208 of FIG. 4 processes and/or interprets the data provided by the multimodal sensor 104 and/or the people analyzer 206 to detect one or more aspects of behavior exhibited by, for example, the audience member 110 of FIG. 1 including, for example, interactions with secondary media devices, such as the secondary media device 112 of FIG. 1. In particular, the example behavior monitor 208 of FIG. 4 includes an engagement level calculator 400 that uses indications of certain behaviors and/or interactions detected via the multimodal sensor 104 to generate an attentiveness metric (e.g., engagement level) for each detected audience member with respect to the primary media device 102 of FIG. 1. In the illustrated example, the engagement level calculated by the engagement level calculator 400 is indicative of how attentive the respective audience member is to the primary media device 102 of FIG. 1. While described herein as calculating engagement levels for the primary media device 102 of FIG. 2, the example behavior monitor 208 of FIG. 4 is also capable of generating engagement level(s) for the environment 100 as a whole and/or for media presentation device(s) other than the primary media device 102 (e.g., for a secondary media device). For example, when the engagement level calculator 400 determines that the audience member 110 of FIG. 1 is sleeping, the engagement level for any media presentation device of the environment 100 is affected by the detection (e.g., is set to a level indicative of disengagement from the respective media presentation device).

The metric generated by the example engagement level calculator 400 of FIG. 4 is any suitable type of value such as, for example, a numeric score based on a scale, a percentage, a categorization, one of a plurality of levels defined by respective thresholds, etc. In some examples, the engagement metric is generated by referencing one or more lookup tables each having, for example, a plurality of threshold values and corresponding scores.

In some examples, the metric generated by the example engagement level calculator 400 of FIG. 4 is an aggregate score or percentage (e.g., a weighted average) formed by combining a plurality of individual engagement level scores or percentages based on different data and/or detections (e.g., to form one or more collective engagement levels). For example, as described below, the example engagement level calculator 400 of FIG. 4 includes a plurality of different components each capable of generating a measurement of engagement for the audience member 110. In some instances, the example engagement level calculator 400 of FIG. 4 combines two or more of the separately generated engagement measurements to form an aggregate engagement score for the audience member.

In the illustrated example of FIG. 4, the engagement level calculator 400 includes an eye tracker 402 to utilize eye position and/or movement data provided by the multimodal sensor 104. In some examples, the eye tracker 402 utilizes coordinate information (e.g., the coordinate 302 of FIG. 3) provided by the example people analyzer 206 to focus an analysis on a particular portion of the data provided by the multimodal sensor 104 known to include (or at least previously include) a person. The example eye tracker 402 of FIG. 4 uses the eye position and/or movement data to determine or estimate whether, for example, a detected audience member is looking in a direction of the primary media device 102, whether the audience member is looking away from the primary media device 102, whether the audience member is looking in the general vicinity of the primary media device 102, or otherwise engaged or disengaged from the primary media device 102. That is, the example eye tracker 402 of FIG. 4 categorizes how closely a gaze of the detected audience member is to the primary media device 102 based on, for example, an angular difference (e.g., an angle of a certain degree) between a direction of the detected gaze and a direct line of sight between the audience member and the primary media device 102. The example eye tracker 402 of FIG. 4 determines a direct line of sight between a first member of the audience and the primary media device 102. Further, the example eye tracker 402 of FIG. 4 determines a current gaze direction of the first audience member. The example eye tracker 402 of FIG. 4 calculates the angular difference between the direct line of sight and the current gaze direction. In some examples the eye tracker 402 of FIG. 4 calculates a plurality of angles between a first vector representative of the direct line of sight and a second vector representative of the gaze direction. In such instances, the example eye tracker 402 of FIG. 4 includes more than one dimension in the calculation of the difference between the direct line of sight and the gaze direction.

In some examples, the eye tracker 402 of FIG. 4 calculates a likelihood that the respective audience member is looking at the primary media device 102 based on, for example, the calculated difference between the direct line of sight and the gaze direction. For example, the eye tracker 402 of FIG. 4 compares the calculated difference to one or more thresholds to select one of a plurality of categories (e.g., looking away, looking in the general vicinity of the primary media device 102, looking directly at the primary media device 102, etc.). In some examples, the eye tracker 402 of FIG. 4 translates the calculated difference (e.g., degrees) between the direct line of sight and the gaze direction into a numerical representation of a likelihood of engagement. For example, the eye tracker 402 of FIG. 4 determines a percentage indicative of a likelihood that the audience member is engaged with the primary media device 102 and/or indicative of a level of engagement of the audience member with the primary media device 102. In such instances, higher percentages indicate proportionally higher levels of attention or engagement.

In some examples, the example eye tracker 402 of FIG. 4 combines measurements and/or calculations taken in connection with a plurality of frames (e.g., consecutive frames). For example, the likelihoods of engagement calculated by the example eye tracker 402 of FIG. 4 can be combined (e.g., averaged) for a period of time spanning the plurality of frames to generate a collective likelihood that the audience member looked at the primary media device 102 for the period of time. In some examples, the likelihoods calculated by the example eye tracker 402 of FIG. 4 are translated into respective percentages indicative of how likely the corresponding audience member(s) are looking at the primary media device 102 over the corresponding period(s) of time. Additionally or alternatively, the example eye tracker 402 of FIG. 4 combines consecutive periods of time and the respective likelihoods to determine whether the audience member(s) were looking at the primary media device 102 through consecutive frames. Detecting that the audience member(s) likely viewed the presentation device 102 through multiple consecutive frames may indicate a higher level of engagement with the television, as opposed to indications that the audience member frequently switched from looking at the presentation device 102 and looking away from the presentation device 102. For example, the eye tracker 402 of FIG. 4 may calculate a percentage (e.g., based on the angular difference detection described above) representative of a likelihood of engagement for each of twenty consecutive frames. In some examples, the eye tracker 402 of FIG. 4 calculates an average of the twenty percentages and compares the average to one or more thresholds, each indicative of a level of engagement. Depending on the comparison of the average to the one or more thresholds, the example eye tracker 402 of FIG. 4 determines a likelihood or categorization of the level of engagement of the corresponding audience member for the period of time corresponding to the twenty frames.

In the illustrated example of FIG. 4, the engagement calculator 400 includes a pose identifier 404 to utilize data provided by the multimodal sensor 104 related to a skeletal framework or profile of one or more members of the audience, as generated by the depth data provided by the multimodal sensor 104. In some examples, the pose identifier 404 utilizes coordinate information (e.g., the coordinate 302 of FIG. 3) provided by the example people analyzer 206 to focus an analysis on a particular portion of the data provided by the multimodal sensor 104 known to include (or at least previously include) a person. The example pose identifier 304 uses the skeletal profile to determine or estimate a pose (e.g., facing away, facing towards, looking sideways, lying down, sitting down, standing up, etc.) and/or posture (e.g., hunched over, sitting, upright, reclined, standing, etc.) of a detected audience member (e.g., the audience member 110 of FIG. 1). Poses that indicate a faced away position from the primary media device 102 (e.g., a bowed head, looking away, etc.) generally indicate lower levels of engagement with the primary media device 102. Upright postures (e.g., on the edge of a seat) indicate more engagement with the primary media device 102. The example pose identifier 404 of FIG. 4 also detects changes in pose and/or posture, which may be indicative of more or less engagement with the primary media device 102 (e.g., depending on a beginning and ending pose and/or posture).

Additionally or alternatively, the example pose identifier 204 of FIG. 4 determines whether the audience member is making a gesture reflecting an emotional state, a gesture intended for a gaming control technique, a gesture to control the primary media device 102, and/or identifies the gesture. Gestures indicating emotional reaction (e.g., raised hands, first pumping, etc.) indicate greater levels of engagement with the primary media device 102. The example engagement level calculator 00 of FIG. 4 determines that different poses, postures, and/or gestures identified by the example pose identifier 404 of FIG. 4 are more or less indicative of engagement with, for example, a current media presentation via the primary media device 102 by, for example, comparing the identified pose, posture, and/or gesture to a look up table having engagement scores assigned to the corresponding pose, posture, and/or gesture. Using this information, the example pose identifier 404 of FIG. 4 calculates a likelihood that the corresponding audience member is engaged with the primary media device 102 for each frame (e.g., or some set of frames) of the media. Similar to the example eye tracker 402 of FIG. 4, the example pose identifier 404 of FIG. 4 can combine the individual likelihoods of engagement for multiple frames and/or audience members to generate a collective likelihood for one or more periods of time and/or can calculate a percentage of time in which poses, postures, and/or gestures indicate the audience member(s) (collectively and/or individually) are engaged with the primary media device 102.

In the illustrated example of FIG. 4, the engagement level calculator 400 includes an audio detector 406 to utilize audio information provided by the multimodal sensor 104. The example audio detector 406 of FIG. 4 uses, for example, directional audio information provided by a microphone array of the multimodal sensor 104 to determine a likelihood that the audience member is engaged with the primary media device 102. For example, a person that is speaking loudly or yelling (e.g., toward the primary media device 102) may be interpreted by the audio detector 406 of FIG. 4 as more likely to be engaged with the primary media device 102 than someone speaking at a lower volume (e.g., because that person is likely having a conversation).

Further, speaking in a direction of the primary media device 102 (e.g., as detected by the directional microphone array of the multimodal sensor 104) may be indicative of a higher level of engagement with the primary media device 102. Further, when speech is detected but only one audience member is present, the example audio detector 406 of FIG. 4 may credit the audience member with a higher level engagement. Further, when the multimodal sensor 104 is located proximate to the primary media device 102, if the multimodal sensor 104 detects a higher (e.g., above a threshold) volume from a person, the example audio detector 406 of FIG. 4 determines that the person is more likely facing the primary media device 102. This determination may be additionally or alternatively made by combining data from the camera of a video sensor.

In some examples, the spoken words from the audience are detected and compared to the context and/or content of the media (e.g., to the audio track) to detect correlation (e.g., word repeats, actors names, show titles, etc.) indicating engagement with the primary media device 102. A word related to the context and/or content of the media is referred to herein as an 'engaged' word.

The example audio detector 406 of FIG. 4 uses the audio information to calculate an engagement likelihood for frames of the media. Similar to the example eye tracker 402 of FIG. 4 and/or the example pose identifier 404 of FIG. 4, the example audio detector 406 of FIG. 4 can combine individual ones of the calculated likelihoods to form a collective likelihood for one or more periods of time and/or can calculate a percentage of time in which voice or audio signals indicate the audience member(s) are paying attention to the primary media device 102.

In the illustrated example of FIG. 4, the engagement level calculator 400 includes a position detector 408, which uses data provided by the multimodal sensor 104 (e.g., the depth data) to determine a position of a detected audience member relative to the multimodal sensor 104 and, thus, the primary media device 102. In some examples, the position detector 408 utilizes coordinate information (e.g., the coordinate 302 of FIG. 3) provided by the example people analyzer 206 to focus an analysis on a particular portion of the data provided by the multimodal sensor 104 known to include (or at least previously include) a person. The example position detector 408 of FIG. 4 uses depth information (e.g., provided by the dot pattern information generated by the laser of the multimodal sensor 104) to calculate an approximate distance (e.g., away from the multimodal sensor 104 and, thus, the primary media device 102 located adjacent or integral with the multimodal sensor 104) at which an audience member is detected. The example position detector 408 of FIG. 4 treats closer audience members as more likely to be engaged with the primary media device 102 than audience members located farther away from the primary media device 102.

Additionally, the example position detector 408 of FIG. 4 uses data provided by the multimodal sensor 104 to determine a viewing angle associated with each audience member for one or more frames. The example position detector 408 of FIG. 4 interprets a person directly in front of the primary media device 102 as more likely to be engaged with the primary media device 102 than a person located to a side of the primary media device 102. The example position detector 408 of FIG. 4 uses the position information (e.g., depth and/or viewing angle) to calculate a likelihood that the corresponding audience member is engaged with the primary media device 102. The example position detector 408 of FIG. 4 takes note of a seating change or position change of an audience member from a side position to a front position as indicating an increase in engagement. Conversely, the example position detector 408 of FIG. 4 takes note of a seating change or position change of an audience member from a front position to a side position as indicating a decrease in engagement. Similar to the example eye tracker 402 of FIG. 4, the example pose identifier 404 of FIG. 4, and/or the example audio detector 406 of FIG. 4, the example position detector 408 of FIG. 4 can combine the calculated likelihoods of different (e.g., consecutive) frames to form a collective likelihood that the audience member is engaged with the primary media device 102 and/or can calculate a percentage of time in which position data indicates the audience member(s) are paying attention to the primary media device 102.

The example engagement level calculator 400 of FIG. 4 includes a secondary device detector 410. The example secondary device detector 410 of FIG. 4 uses detections of light patterns and/or glows in image data (e.g., data provided by the multimodal sensor 104) to (1) determine whether the audience member 110 is interacting with a secondary media device (e.g., the first secondary media device 112 of FIG. 1), (2) to identify a type of the secondary media device being used by the audience member, (3) to identify the secondary media device itself, (4) to detect presence of a secondary media device (e.g., the first secondary media device 112 and/or the second secondary media device 114 of FIG. 1), and/or (5) to determine an engagement level based on the detected interaction with the secondary media device and/or an effect on an engagement level for the audience member 110 already calculated by, for example, one or more of the other components 402-408 of the engagement level calculator 400. The light patterns and/or glows detected in the image data are referred to herein as light information. In some examples, the secondary device detector 410 utilizes coordinate information (e.g., the coordinate 302 of FIG. 3) provided by the example people analyzer 206 to focus a search for the light information on a particular portion of the data provided by the multimodal sensor 104 known to include (or at least previously include) a person. The example secondary device detector 410 of FIG. 4 is described in detail below in connection with FIGS. 5-7.

In some examples, the engagement level calculator 400 bases individual ones of the engagement likelihoods and/or scores on particular combinations of detections from different ones of the eye tracker 402, the pose identifier 404, the audio detector 406, the position detector 408, the secondary device detector 410, and/or other component(s). For example, the engagement level calculator 400 of FIG. 4 generates a relatively high engagement likelihood and/or score for a combination of the eye tracker 402 determining that the audience member 110 is looking at the primary media device 102 and the secondary device detector 410 determining that the audience member 110 is not interacting with the first secondary media device 112. Additionally or alternatively, the example engagement level calculator 400 of FIG. 4 generates a relatively low engagement likelihood and/or score for a combination of the eye tracker 402 determining that the audience member 110 is looking away from the primary media device 102 and the secondary device detector 410 determining that the audience member 110 is interacting with the first secondary media device 112.

Additionally or alternatively, the example engagement level calculator 400 of FIG. 4 generates a relatively high engagement likelihood and/or score for a combination of the pose identifier 404 determining that the audience member 110 is making a gesture known to be associated with the video game system 108 and the secondary device detector 410 determining that the audience member 110 is not interacting with the first secondary media device 112. Additionally or alternatively, the example engagement level calculator 400 of FIG. 4 generates a relatively low engagement likelihood and/or score for a combination of the pose identifier 404 determining that the audience member 110 is sitting in a hunched over pose and the secondary device detector 410 determining that the audience member 110 is interacting with the first secondary media device 112 and/or the second secondary media device 114.

Additionally or alternatively, the example engagement level calculator 400 of FIG. 4 generates a relatively high engagement likelihood and/or score for a combination of the audio detector 406 determining that the audience member 110 is quiet and the secondary device detector 410 determining that the audience member 110 is not interacting with the first secondary media device 112. Additionally or alternatively, the example engagement level calculator 400 of FIG. 4 generates a relatively low engagement likelihood and/or score for a combination of the audio detector determining that the audience member 110 is speaking softly and the secondary device detector 410 determining that the audience member 110 is interacting with the first secondary media device 112.

Additionally or alternatively, the example engagement level calculator 400 of FIG. 4 generates a relatively high engagement likelihood and/or score for a combination of the position detector 408 determining that the audience member 110 is located directly in front of the primary media device 102 and four (4) feet away from the primary media device 102 and the secondary device detector 410 determining that the audience member 110 is not interacting with the first secondary media device 112. Additionally or alternatively, the example engagement level calculator 400 of FIG. 4 generates a relatively low engagement likelihood and/or score for a combination of the position detector 408 determining that the audience member 110 is located at an obtuse angle from the primary media device 102 and the secondary device detector 410 determining that the audience member 110 is interacting with the first secondary media device 112.

Additionally or alternatively, the example engagement level calculator 400 of FIG. 4 generates a relatively high engagement likelihood and/or score for a combination of the position detector 408 determining that the audience member 110 is located directly in front of the primary device 102 and the secondary device detector 410 determining that the audience member 110 is more than a threshold distance (e.g., three (3) feet) from the second secondary media device 114. Additionally or alternatively, the example engagement level calculator 400 of FIG. 4 generates a relatively low engagement likelihood and/or score for a combination of the position detector 408 determining that the audience member 110 is located at an obtuse angle from the primary media device 102 and the secondary device detector 410 determining that the audience member is less than a threshold distance away from the second secondary media device 114.

Further, in some examples, the engagement level calculator 400 combines or aggregates the individual likelihoods and/or engagement scores generated by the eye tracker 402, the pose identifier 404, the audio detector 406, the position detector 408, and/or the secondary device detector 410 to form an aggregated likelihood for a frame or a group of frames of media (e.g. as identified by the media detector 202 of FIG. 2) presented by the primary media device 102. The aggregated likelihood and/or percentage is used by the example engagement level calculator 400 of FIG. 4 to assign an engagement level to the corresponding frames and/or group of frames. In some examples, the engagement level calculator 400 averages the generated likelihoods and/or scores to generate the aggregate engagement score(s). Alternatively, the example engagement level calculator 400 of FIG. 4 calculates a weighted average of the generated likelihoods and/or scores to generate the aggregate engagement score(s). In such instances, configurable weights are assigned to different ones of the detections associated with the eye tracker 402, the pose identifier 404, the audio detector 406, the position detector 408, and/or the secondary device detector 410.

Moreover, the example engagement level calculator 400 of FIG. 4 factors an attention level of some identified individuals (e.g., members of the example household of FIG. 1) more heavily into a calculation of a collective engagement level for the audience more than others individuals. For example, an adult family member such as a father and/or a mother may be more heavily factored into the engagement level calculation than an underage family member. As described above, the example meter 106 of FIGS. 1 and/or 2 is capable of identifying a person in the audience as, for example, a father of a household. In some examples, an attention level of the father contributes a first percentage to the engagement level calculation and an attention level of the mother contributes a second percentage to the engagement level calculation when both the father and the mother are detected in the audience. For example, the engagement level calculator 400 of FIG. 4 uses a weighted sum to enable the engagement of some audience members to contribute to a "whole-room" engagement score than others. The weighted sum used by the example engagement level calculator 400 of FIG. 4 can be generated by Equation 1 below.

$$RoomScore = \frac{DadScore * (0.3) + MomScore * (0.3) + TeenagerScore * (0.2) + ChildScore * (0.1)}{FatherScore + MotherScore + TeenagerScore + ChildScore}$$ Equation 1

The above equation assumes that all members of a family are detected. When only a subset of the family is detected, different weights may be assigned to the different family members. Further, when an unknown person is detected in the room, the example engagement level calculator 400 of FIG. 4 assigns a default weight to the engagement score calculated for the unknown person. Additional or alternative combinations, equations, and/or calculations are possible.

Engagement levels generated by the example engagement level calculator 400 of FIG. 4 are stored in an engagement level database 412. Content of the example engagement level database 412 of FIG. 4 are periodically and/or aperiodically exported to, for example, the data collection facility 216.

While an example manner of implementing the behavior monitor 208 of FIG. 2 has been illustrated in FIG. 4, one or more of the elements, processes and/or devices illustrated in FIG. 4 may be combined, divided, re-arranged, omitted, eliminated and/or implemented in any other way. Further, the example engagement level calculator 400, the example eye tracker 402, the example pose identifier 404, the example audio detector 406, the example position detector 408, the example secondary device detector 410, and/or, more generally, the example behavior monitor 208 of FIG. 4 may be implemented by hardware, software, firmware and/or any combination of hardware, software and/or firmware. Thus, for example, any of the example engagement level calculator 400, the example eye tracker 402, the example pose identifier 404, the example audio detector 406, the example position detector 408, the example secondary device detector 410, and/or, more generally, the example behavior monitor 208 of FIG. 4 could be implemented by one or more circuit(s), programmable processor(s), application specific integrated circuit(s) (ASIC(s)), programmable logic device(s) (PLD(s)) and/or field programmable logic device(s) (FPLD(s)), field programmable gate array (FPGA), etc. When any of the apparatus or system claims of this patent are read to cover a purely software and/or firmware implementation, at least one of the example engagement level calculator 400, the example eye tracker 402, the example pose identifier 404, the example audio detector 406, the example position detector 408, the example secondary device detector 410, and/or, more generally, the example behavior monitor 208 of FIG. 4 are hereby expressly defined to include a tangible computer readable storage medium such as a storage device (e.g., memory) or an optical storage disc (e.g., a DVD, a CD, a Bluray disc) storing the software and/or firmware. Further still, the example behavior monitor 208 of FIG. 4 may include one or more elements, processes and/or devices in addition to, or instead of, those illustrated in FIG. 4, and/or may include more than one of any or all of the illustrated elements, processes and devices.

Figure 5:
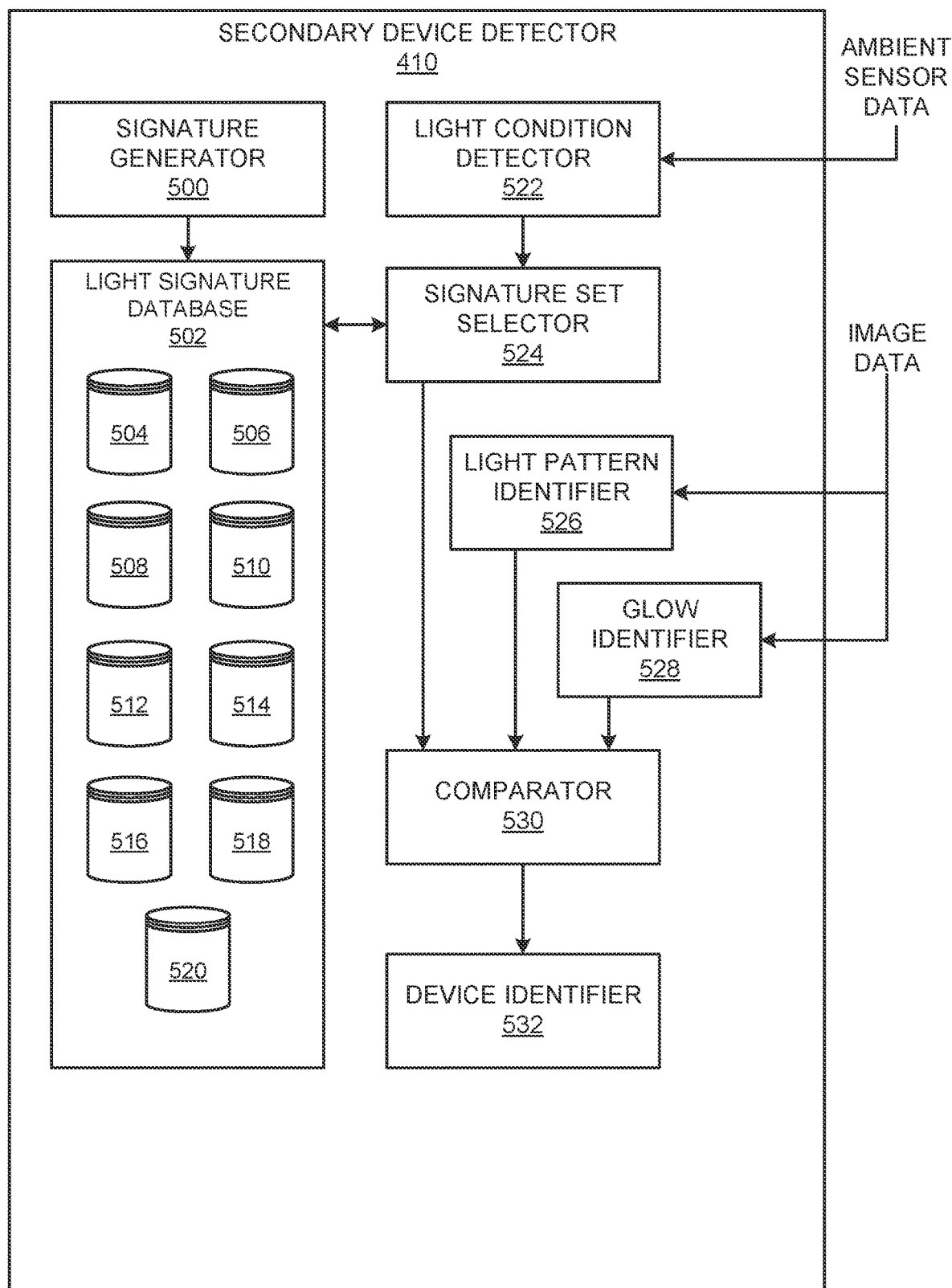
FIG. 5 is a block diagram of an example implementation of the example secondary device detector of FIG. 3.

FIG. 5 is a block diagram of an example implementation of the example secondary device detector 410 of FIG. 4. The example secondary device detector 410 of FIG. 5 analyzes image data of the environment 100 to determine whether audience member(s) are interacting with a secondary media device (e.g., a media presentation device other than the primary media device 102 of FIG. 1). In particular, the example secondary device detector 410 of FIG. 5 searches for light patterns projected onto an object (e.g., a face) and/or glows emanating from a device. For example, the first secondary media device 112 of FIG. 1 with which the audience member 110 is interacting projects light onto the face of the audience member 110 and, in doing so, creates a particular light pattern on the face of the audience member 110. The example secondary device detector 410 of FIG. 5 detects the light pattern and uses data related to the detected light pattern to, for example, calculate an engagement level of the audience member 110 for the primary media device 102 in view of the interaction with the secondary media device 112, identify a type of the secondary media device 112, and/or identify the secondary media device 112 itself (e.g., by brand and/or model). Additionally or alternatively, the second secondary media device 114 in the environment 100 is powered on and producing light that forms a glow emanating from a screen of the device 112. A similar glow is also generated by the first secondary media device 112. The example secondary device detector 410 of FIG. 5 detects the glow(s) and uses data related to the glow(s) to, for example, determine that the first and/or second secondary media devices 112, 114 are present (and powered on) in the environment.

To detect light signatures corresponding to light patterns projected on an object, the example secondary device detector 410 of FIG. 5 includes a signature generator 500 to generate, receive, obtain, and/or update light signatures representative of light patterns known to correspond to, for example, a type of media presentation device and/or a particular media presentation device. In some examples, the light signatures generated, received, obtained, and/or updated by the signature generator 500 each correspond to a pattern of light on a body of a person (e.g., a face of a person) projected by the corresponding type of media presentation device and/or particular media presentation device. In some examples, the light signatures include multi-dimensional characteristics or measurements representative of, for example, brightness, hue, and/or contrast values of proximate portions of image data. For example, a light signature may include a series of expected brightness values relative to each other (e.g., brightness deltas) that follow a contour of a human face and/or head. In such instances, different ones of the light signatures correspond to different orientations of the human face and/or head relative to, for example, the multimodal sensor 104 providing the corresponding image data. In some examples, the light signatures are representative of expected differences between a first amount of light projected on a face looking at nearby screen (e.g., a tablet being held in front of the face) and a second amount of light found on a different body part, such as a shoulder or chest of the person. In some examples, the light signatures include contrast values indicative of difference(s) between the brightness found on a face and the brightness of an area surrounding the face, such as an ambient amount of brightness. In some examples, the light signatures include frequency spectrums indicative of different hues found at, for example, different depths and/or other image locations. In some examples, the light signatures include intensity graphs representative of light measurements in different portions of the image data. The example light signatures can include and/or be based on additional or alternative types of data, measurement(s), and/or characteristic(s).

In some examples, the example signature generator 500 of FIG. 5 utilizes test results associated with light patterns measured during, for example, a laboratory analysis performed to determine characteristics of light patterns produced by displays of different media presentation devices. For example, a first test may determine a first light signature for a first type of media presentation device being used (e.g., held and/or looked at) by a person. The first light signature corresponds to, for example, light projected from a display of a certain type of media presentation device onto a face and/or other body part of a person. In another example, a second test may determine a second light signature for a particular brand and/or model of media presentation being used by a person. The second light signature corresponds to, for example, light projected from a display of a particular brand and/or model of media presentation device onto a face and/or other body part of a person. In addition to or in lieu of utilizing the test results to generate the light signatures, the example signature generator 500 of FIG. 5 may implement one or more algorithms to determine an expected light pattern generated by, for example, a media presentation device being held by a person. The example signature generator 500 can utilize any additional or alternative techniques or components to generate light signatures corresponding to, for example, the audience member 110 of FIG. 2 interacting with a secondary media device.

In the illustrated example of FIG. 5, the light signature generator 500 generates different light signatures for different lighting conditions of an environment in which the example secondary device detector 410 of FIG. 5 is implemented. The light patterns to be detected by the example secondary device detector 410 of FIG. 5 may be more difficult or less difficult to detect in some lighting conditions than others. In the illustrated example of FIG. 5, the light signature generator 500 generates sets of light signatures, each corresponding to one of a plurality of different lighting conditions. A set generated by the example light signature generator 500 of FIG. 5 includes, for example, light signature(s) corresponding to device type detection (e.g., identification of type(s) of device(s)) and/or light signature(s) corresponding to device detection (e.g., identification of particular device(s)).

The example light signature generator 500 of FIG. 5 generates a first set of light signatures 504 for use when the environment 100 is full of daylight. To generate such a first set of signatures 504, a test environment is filled with daylight and light pattern detection tests are executed on a test subject located in the naturally lit test environment. Further, the example light signature generator 500 of FIG. 5 generates a second set of light signatures 506 for use when the environment 100 is full of artificial light (e.g., from one or more lamps and/or the glow from the primary media device 102). To generate such a second set of signatures 506, a test environment is filled with artificial light and light pattern detections tests are executed on a test subject located in the artificially lit test environment. Further, the example light signature generator 500 of FIG. 5 generates a third set of light signatures 508 for use when the environment 100 includes a mixture of daylight and artificial light. To generate such a third set of signatures 508, a test environment is filled with a combination of daylight and artificial light and light pattern detections tests are executed on a test subject located in the naturally and artificially lit test environment. Further, the example light signature generator 500 of FIG. 5 generates a fourth set of light signatures 510 for use when the environment 100 includes a first ratio of daylight to artificial light. To generate such a fourth set of signatures 510, a test environment is filled with a first amount of daylight and a second amount of artificial light and light pattern detection tests are executed on a test subject located in the naturally and artificially lit test environment. Further, the example light signature generator 500 of FIG. 5 generates a fifth set of light signatures 512 for use when the environment 100 includes a second ratio of daylight to artificial light different than the first ratio associated with the fourth set of light signatures 510. To generate such a fifth set of signatures 512, a test environment is filled with a third amount of daylight and a fourth amount of artificial light and light pattern detection tests are executed on a test subject located in the naturally and artificially lit test environment. Further, the example light signature generator 500 of FIG. 5 generates a sixth set of light signatures 514 for use when the environment 100 includes a first total amount of light. To generate such a sixth set of signatures 514, a test environment is filled with the first amount of total light (e.g., all daylight, all artificial light, or a combination of daylight and artificial light) and light pattern detection tests are executed on a test subject located in the test environment. Further, the example light signature generator 500 of FIG. 5 generates a seventh set of light signatures 516 for use when the environment 100 includes a second total amount of light. To generate such a seventh set of signatures 516, a test environment is filled with the second amount of total light (e.g., all daylight, all artificial light, or a combination of daylight and artificial light) and light pattern detection tests are executed on a test subject located in the test environment. Further, the example light signature generator 500 of FIG. 5 generates an eighth set of light signatures 518 for use at a first time of day. To generate such a eighth set of signatures 518, light pattern detection tests are executed on a test subject located in the test environment at the first time of day. Further, the example light signature generator 500 of FIG. 5 generates a ninth set of light signatures 520 for use at a second time of day. To generate such a ninth set of signatures 520, light pattern detection tests are executed on a test subject located in the test environment at the second time of day. The example light signature generator 500 of FIG. 5 can generate additional or alternative set(s) 510 of light signatures corresponding to, for example, different lighting conditions, different types of artificial light sources (e.g., CFL, incandescent, etc.) and/or other characteristics of the environment 100. Any or all of the above tests can be performed for different devices to develop sets of signatures for different devices types, manufacturers, models, etc.

Figure 6:
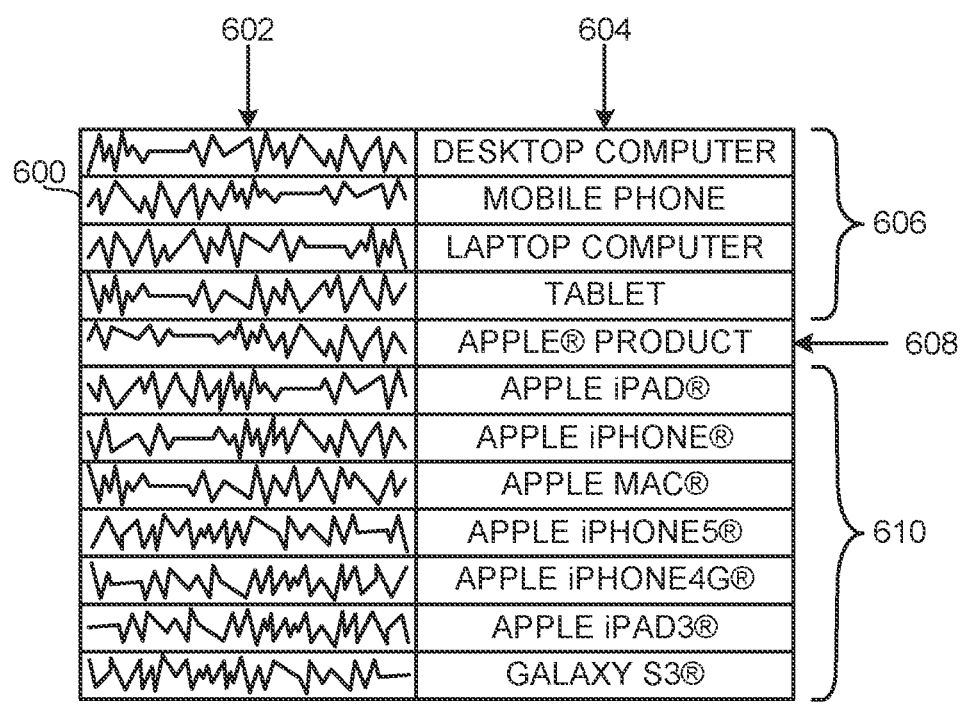
FIG. 6 is an illustration of an example implementation of a set of light signatures of FIG. 5.

FIG. 6 illustrates an example implementation of the first set of light signatures 504 of FIG. 5. The example first set of light signatures 504 is shown in a table 600 having a signature column 602 and an identifier column 604. In the example of FIG. 6, entries in the identifier column 604 correspond to a respective entry in the signature column 602. That is, each one of the signatures in the signature column 602 corresponds to an identifier in the identifier column 604 that provides identifying information indicative of, for example, a usage detection, the type of device, and/or the particular device (e.g., by model, by, manufacturer, etc.) known to project a light pattern similar to the corresponding light signature of the signature column 602. In the example of FIG. 6, a first portion 606 of the table 600 includes identifiers of types of media devices. Thus, signatures of the first portion 606 are known to correspond to a particular respective type of media device such as, for example, a tablet, a mobile telephone, a laptop computer, a desktop computer, etc. A second portion 608 of the table 600 of FIG. 6 includes an identifier of a particular brand of media device, such as Apple® products. A third portion 610 of the table 600 of FIG. 6 includes identifiers of particular media devices as identified by, for example, product name and/or model. In some examples, a type of media presentation device can be inferred from the brand name and/or model identification. For example, if the example table 600 of FIG. 6 is used to identify the first secondary device 112 as an Apple iPad®, it can be inferred that the first secondary device 112 is a tablet. Such associations between specific products and device types can be stored in, for example, the example table 600 of FIG. 6. Additional or alternative types of information can be included in the example table 600 of FIG. 6. In the illustrated example, tables similar to the example table 600 of FIG. 6 are used to implement the example sets of light signatures 504-520 of the example light signature database 502 of FIG. 5.

The example secondary device detector 410 of FIG. 5 includes a light condition detector 522 that receives signal(s) from the example ambient light sensor 204 of FIG. 2. The example ambient light sensor 204 of FIG. 2 provides the light condition detector 522 with data related to the light present in the environment 100. The example light condition detector 522 processes the signal(s) provided by the ambient light sensor 204 to calculate an amount of natural light in the environment 100, an amount of artificial light in the environment 100, a ratio of natural light to artificial light in the environment 100, a total amount of light in the environment 100, and/or any other suitable lighting characteristics or conditions.

The example secondary device detector 410 of FIG. 5 includes a signature set selector 524 to select one or more of the sets of light signatures 504-520 of the example light signature database 502. In the illustrated example of FIG. 5, the signature set selector 524 uses indication(s) generated by the example light condition detector 522 of FIG. 5 to make a selection from the light signature database 502. For example, when the light condition detector 522 indicates that the environment 100 is full of natural light, the example signature set selector 524 selects the first set of light signatures 504. Additionally or alternatively, the example signature set selector 524 of FIG. 5 uses a time of day to make a selection from the light signatures database 502. For example, at the first time of day mentioned above in connection with the light signature database 502, the example signature set selector 524 selects the eighth set of light signatures 518. In some examples, the signature set selector 524 selects more than one set of light signature depending on, for example, how many of the lighting conditions associated with the light signature database 502 are met by current conditions of the environment 100.

The example secondary device detector 410 of FIG. 5 includes a light pattern identifier 526 to detect light patterns projected onto object(s) in the environment 100, such as the face of the audience member 110. As described above, the example device usage indicator 410 receives image data (e.g., frames of three-dimensional data and/or two-dimensional data) representative of the environment 100. The example light pattern identifier 526 searches the received image data for instances in which a localized light pattern is found on one or more body parts of a person. A localized light pattern is detected by, for example, identifying portions of the image data including intensities (e.g., on a grayscale) that sharply contrast with immediate surroundings. In some examples, the light pattern identifier 526 searches the entire frames of image data for the localized light patterns. Additionally or alternatively, the example light pattern identifier 526 of FIG. 5 utilizes face detections generated by, for example, the people analyzer 206 of FIG. 2. For example, when the people analyzer 206 provides a coordinate (e.g., the coordinate 302 of FIG. 3) to the example device usage indicator 410 of FIG. 5, the example light pattern identifier 526 may focus a search for localized light patterns to a portion of the image data corresponding to the received coordinate. For example, the light pattern identifier 526 of FIG. 5 searches a circular or rectangular (or any other suitable shape) area of image data centered on the received coordinate corresponding to a face detection. In doing so, the example light pattern identifier 526 saves computational resources by avoiding performance of a search of the entire frame of image data. In some examples, the light pattern identifier 526 is triggered in response to receiving a face detection from the people analyzer 206. In some examples, the light pattern identifier 526 is periodically triggered in response to a scheduled event (e.g., according to a timer).

The example light pattern identifier 526 of FIG. 5 provides image data corresponding to detected light pattern(s) found on, for example, the audience member 110 to a comparator 530. Further, the example signature set selector 524 provides comparator 530 with the selected set(s) of light signatures and/or an instruction of which set(s) of light signatures were selected. As described above, more than one set of light signatures are selected by the example signature set selector 524 when the current lighting condition of the environment satisfies more than one of the sets of the light signatures 504-520. The example comparator 530 of FIG. 5 compares the detected light signature(s) found on the audience member 110 to the light signatures of the selected set(s) of light signatures. In the illustrated example, the comparator 530 generates a similarity score indicative of how closely the detected light patterns in the environment 100 match the selected light signatures. The similarly scores generated by the example comparator 530 are of any suitable format such as, for example, a percentage or a scale value.

The example secondary device detector 410 of FIG. 5 includes a device identifier 532 to receive the similarity scores from the comparator 530. The example device identifier 532 of FIG. 5 manages one or more thresholds to which the similarity scores are compared. In the illustrated example, the threshold(s) used by the device identifier 532 represent how closely the detected light patterns need to match the selected light signature(s) to be considered as corresponding to the respective device type and/or particular product. In some examples, the device identifier 532 includes different thresholds for different ones of the light signatures. For example, the device identifier 532 of FIG. 5 uses a first threshold for the first portion 606 of the example table 600 of FIG. 6 and a second, different threshold for the third portion 610 of the table 600. In some examples, the first threshold is greater than the second threshold, thereby requiring the detected light patterns to match the signatures of the third portion 610 more closely than the signatures of the first portion 606 to be considered a detection of the respective device type and/or particular product. In some examples, the device identifier 532 includes a global threshold to be applied to each of the similarity scores received from the comparator 530.

If the example device identifier 532 of FIG. 5 determines that a similarity score generated by the example comparator 530 meets or exceeds one or more of the appropriate usage thresholds, the example device identifier 532 generates a usage indicator that the corresponding light signature(s) are present in the analyzed image data of the environment 100. As described above, such an indication is indicative of, for example, interaction with a particular type of secondary media device and/or a particular secondary media device. For example, the device identifier 532 of FIG. 5 generates an indicator that the audience member 110 of FIG. 1 is interacting with the first secondary media device 112 and an identifier (e.g., device type, product name, manufacturer, model number, etc.) of the first secondary media device 112 when the corresponding threshold has been met or exceeded. In some examples, the device identifier 532 of FIG. 5 generates a confidence level in conjunction with the usage indications representative of a degree at which the corresponding threshold was exceeded by the similarity score. That is, when the similarity of the detected light pattern to the selected light signature exceeds the corresponding threshold by a first degree, the example device identifier 532 of FIG. 5 assigns a first confidence level to the generated usage indication. Further, when the similarity of the detected light pattern to the selected light signature exceeds the corresponding threshold by a second degree lesser than the first degree, the example device identifier 532 of FIG. 5 assigns a second confidence level less than the first confidence level to the generated usage indication.

The example secondary device detector 410 of FIG. 5 also includes a glow identifier 528 to detect glow(s) present in the environment 100. The example glow identifier 528 of FIG. 5 identifies instances in the image data of localized brightness that correspond to, for example, an amount of light emanating from a display of the second secondary media device 114 of FIG. 1. In some examples, the glow identifier 528 identifies portions of the image data of a certain size that include higher brightness values surrounded by lower brightness values. In some example, the glow identifier 528 generates and/or utilizes an intensity graph of the room representative of light characteristic values (e.g., brightness, hue, contrast, etc.) to identify the portions likely to correspond to a glow emanating from a screen. In some examples, the glow identifier 528 uses location information associated with, for example, a face detection to focus an analysis on a designated portion of the image data, such as a circle or rectangular surrounding the coordinate 302 of FIG. 3. In some examples, the glow identifier 528 is periodically triggered in response to a scheduled event (e.g., according to a timer).

In the illustrated example, the glow identifier 528 generates a presence indication when a glow from a secondary media device is detected. Thus, the presence indications generated by the example glow identifier 528 indicate that a secondary media device is present in the environment 100. For example, the glow identifier 528 of FIG. 5 determines that the second secondary media device 114 is present in the environment 100. Additionally or alternatively, the example glow identifier 528 of FIG. 5 determines that the first secondary media device 112 is present in the environment 100 when the glow emanating from the first secondary media device 112 is detectable (e.g., according to the orientation of the first secondary media device 112 relative to the multimodal sensor 104). In some examples, the glow identifier 528 of FIG. 5 generates a confidence level associated with the determination that the second secondary media device 114 is present in the environment 100. The confidence level is based on, for example, a similarity between the collected data and the image characteristics known to correspond to a glow emanating from a display.

In some examples, the glow identifier 528 of FIG. 5 measures a distance between a detected glow and detected audience member(s). For example, when the glow identifier 528 identifies a glow emanating from the second secondary media device 114 of FIG. 1, the glow identifier 528 determines a distance between the second secondary media device 114 and the audience member 110. In the illustrated example, the glow identifier 528 utilizes information generated by the people analyzer 206 of FIG. 2, such as the example coordinate 302 of FIG. 3 indicative of a location of the audience member 110 in the environment 100. In some examples, the glow identifier 528 and/or the example engagement level calculator 400 of FIG. 4 base an engagement level on the distance between the detected glow and the audience member 110. For example, a first distance between the detected glow and the audience member 110 is indicative of first level of engagement and a second distance between the detected glow and the audience member 110 is indicative of a second level of engagement. That is, in some examples, the second secondary media device 114 is considered more likely to draw attention away from the primary media device 102 when the second secondary media device 114 is close to the audience member 110.

In some examples, the glow identifier 528 detects changes in the glow emanating from, for example, the second secondary media device 114 of FIG. 1 (e.g., over a period of time, such as three (3) seconds and/or the corresponding amount of frames). The example glow identifier 528 and/or the example engagement level calculator 400 of FIG. 4 interprets changes in the glow as indications that the second secondary media device 114 is currently presenting media and, for example, is more likely to draw the attention of the audience member 110 (e.g., than a static display).

In the illustrated example, data generated by the example device identifier 532 (e.g., the usage indication(s) and/or the corresponding confidence level(s)) and/or data generated by the example glow identifier 528 (e.g., the presence indication(s), the corresponding confidence level(s), and/or the distances between the present secondary media device(s) and the audience member(s)) are used to calculate an engagement level for the audience member 110 with respect to, for example, the primary media device 102. In some examples, an engagement level for the audience member 110 calculated by other component(s) of the engagement level calculator 400 (e.g., the eye tracker 402, the pose identifier 404, the audio detector 406 and/or the position detector 408) can be adjusted (e.g., decreased or increased) when the example usage detector 532 of FIG. 5 determines that the audience member 110 is interacting with the first secondary media device 112 and/or that the first and/or secondary media devices 112, 114 are present in the environment 100. In some examples, the amount of adjustment in the already calculated engagement level depends on, for example, the corresponding confidence level generated by the example device identifier 532 and/or glow identifier 528.

Additionally or alternatively, the example engagement level calculator 400 of FIG. 4 generates an engagement level for the audience member 110 with respect to the primary media device 102 based solely on the usage indications generated by the example device identifier 532 and/or based solely on the presence indications generated by the example glow identifier 528. For example, the engagement level calculator 400 of FIG. 4 assigns a first engagement level to the audience member 110 for the primary media device 102 when the example device identifier 532 indicates that the audience member 110 is interacting with the first secondary media device 112 and a second engagement level when the example device identifier 532 indicates that the audience member 110 is not interacting with the first secondary media device 112. Additionally or alternatively, the example engagement level calculator 400 of FIG. 4 assigns a third engagement level to the audience member 110 with respect to the primary media device 102 when the example device identifier 534 indicates that the first secondary media device 112 is a first type of media device (e.g., a tablet) and a fourth engagement level when the first secondary media device 112 is a second type of media device (e.g. a mobile phone) different from the first type of media device. Additionally or alternatively, the example engagement level calculator 400 of FIG. 4 assigns a fifth engagement level to the audience member 110 with respect to the primary media device 102 when the example device identifier 534 indicates that the first secondary media device 112 is a first media device (e.g., an Apple® iPad®) and a sixth engagement level when the secondary media device 112 is a second media device (e.g., an Apple® iPhone®).

Additionally or alternatively, the example engagement level calculator 400 of FIG. 4 assigns a seventh engagement level to the audience member 110 for the primary media device 102 when the example glow identifier 532 indicates that the second secondary media device 114 is present in the environment 100 and a eighth engagement level when the example glow identifier 528 indicates that the second secondary media device 114 is not present (or powered off) in the environment 100.

Additionally or alternatively, the example engagement level calculator 400 of FIG. 4 assigns a ninth engagement level to the audience member 110 based on the confidence level(s) associated with the generated usage indications. That is, the engagement level generated for the example audience member 110 can depend on, for example, how closely the detected light pattern on the audience member 110 matches the corresponding light signature. Additionally or alternatively, the example engagement level calculator 400 of FIG. 4 assigns a tenth engagement level to the audience member 110 based on the confidence level(s) associated with the generated presence indications. That is, the engagement level generated for the example audience member 110 can depend on, for example, how closely the detected glow matches the light characteristics associated with a glow emanating from a secondary media device.

In some examples, an calculated engagement level already calculated for the audience member 110 by other component(s) of the engagement level calculator 400 (e.g., the eye tracker 402, the pose identifier 404, the audio detector 406 and/or the position detector 408) can be adjusted (e.g., increased or decreased) when the example device identifier 532 of FIG. 5 determines that the audience member 110 is interacting with a particular type of secondary media device and/or a particular secondary media device. In other words, the example audience member 110 may be considered less likely to be paying attention to the primary media device 102 while interacting with a tablet than while interacting with a laptop computer. The amount of adjustment to the calculated engagement level depends on, for example, the corresponding confidence level generated by the example device identifier 532.

In some examples, the engagement level calculator 400 combines different indications (e.g., a first indication of a type of device and a second indication of a particular device) to generate an aggregate engagement level for the audience member 110. In some examples, the secondary device detector 410 of FIG. 5 combines usage indication(s) generated by the device identifier 532 with presence indication(s) generated by the glow identifier 528 to calculate an aggregate engagement level for the audience member 110 with respect to the primary media device 102. Additionally or alternatively, the engagement level(s) calculated by the example device identifier 532 and/or the glow identifier 528 can be combined with the engagement level(s) generated by, for example, the eye tracker 302, the pose identifier 304, the audio detector 406, the position detector 408 and/or any other component.

While an example manner of implementing the secondary device detector 410 of FIG. 4 has been illustrated in FIG. 5, one or more of the elements, processes and/or devices illustrated in FIG. 5 may be combined, divided, re-arranged, omitted, eliminated and/or implemented in any other way. Further, the example signature generator 500, the example light condition detector 522, the example signature set selector 524, the example light pattern identifier 526, the example glow identifier 528, the example comparator 530, the example device identifier 532 and/or, more generally, the example secondary device detector 410 of FIG. 5 may be implemented by hardware, software, firmware and/or any combination of hardware, software and/or firmware. Thus, for example, any of the example signature generator 500, the example light condition detector 522, the example signature set selector 524, the example light pattern identifier 526, the example glow identifier 528, the example comparator 530, the example device identifier 532 and/or, more generally, the example secondary device detector 410 of FIG. 5 could be implemented by one or more circuit(s), programmable processor(s), application specific integrated circuit(s) (ASIC(s)), programmable logic device(s) (PLD(s)) and/or field programmable logic device(s) (FPLD(s)), field programmable gate array (FPGA), etc. When any of the apparatus or system claims of this patent are read to cover a purely software and/or firmware implementation, at least one of the example signature generator 500, the example light condition detector 522, the example signature set selector 524, the example light pattern identifier 526, the example glow identifier 528, the example comparator 530, the example device identifier 532 and/or, more generally, the example secondary device detector 410 of FIG. 5 are hereby expressly defined to include a tangible computer readable storage medium such as a storage device (e.g., memory) or an optical storage disc (e.g., a DVD, a CD, a Bluray disc) storing the software and/or firmware. Further still, the example secondary device detector 410 of FIG. 5 may include one or more elements, processes and/or devices in addition to, or instead of, those illustrated in FIG. 5, and/or may include more than one of any or all of the illustrated elements, processes and devices.

While the example secondary device detector 410 of FIGS. 4 and/or 5 is described above as implemented in the example meter 106 of FIGS. 1 and/or 2, the example secondary device detector 410 or at least one component of the example secondary device detector 410 can be implemented in, for example, the first and/or second secondary media devices 112, 114 of FIG. 1. In such instances, components implemented in the secondary media device(s) 112, 114 are in communication with the meter 106 and exchange data (e.g., in real time). In some examples, the light condition detector 522 is implemented via a light sensor on the first secondary media device 112. In some examples, the light pattern identifier 526 is implemented via the first secondary media device 112 and detects lights patterns on a face proximate the display of the first secondary media device 112. In some examples, the glow identifier 528 is implemented via the second secondary media device 114 and detects the glow emanating from the display of the second secondary media device 114 (when the display is on). Additional or alternative combinations of components of the example secondary device detector 410 are possible.

Figure 7:
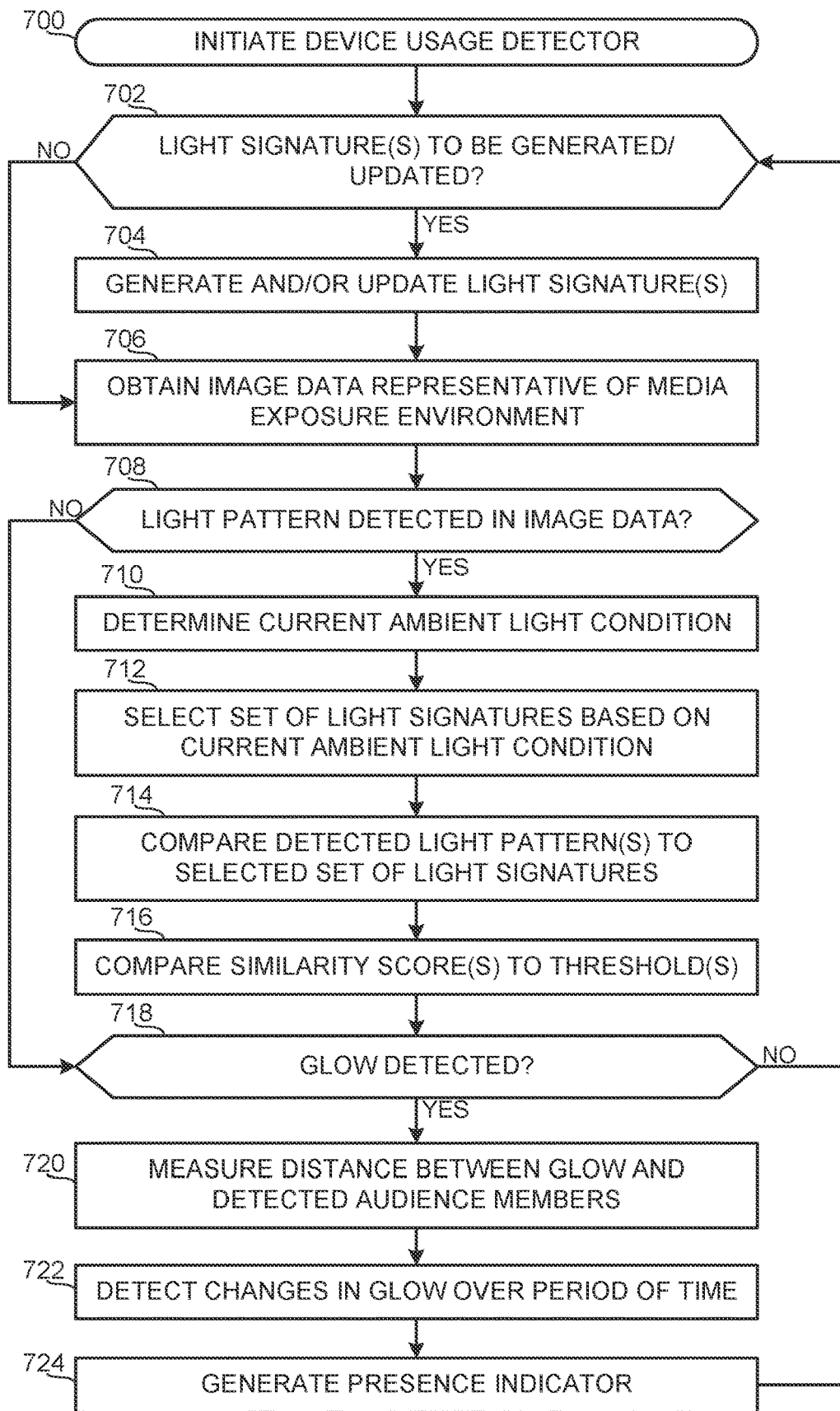
FIG. 7 is a flowchart representation of example machine readable instructions that may be executed to implement the example secondary device detector of FIGS. 4 and/or 5.

FIG. 7 is a flowchart representative of example machine readable instructions for implementing the example secondary device detector 410 of FIGS. 4 and/or 5. In the example of FIG. 7, the machine readable instructions comprise a program for execution by a processor such as the processor 812 shown in the example processing platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowchart illustrated in FIG. 7, many other methods of implementing the example secondary device detector 410 may alternatively be used. For example, the order of execution of the blocks may be changed, and/or some of the blocks described may be changed, eliminated, or combined.

As mentioned above, the example processes of FIG. 7 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disc and to exclude propagating signals. Additionally or alternatively, the example processes of FIG. 7 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage medium in which information is stored for any duration (e.g., for extended time periods, permanently, brief instances, for temporarily buffering, and/or for caching of the information). As used herein, the term non-transitory computer readable storage medium is expressly defined to include any type of computer readable storage device or storage disc and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example flowchart of FIG. 7 begins with an initiation of the device usage detector 700 which coincides with, for example, the example meter 106 of FIG. 1 being powered on and/or otherwise activated (e.g., in response to the primary media device 102 being powered one) (block 700). In some instances, the initiation of the secondary device detector 410 causes the example signature generator 500 of FIG. 5 to generate, update, and/or receive one or more light signatures. If the example signature generator 500 of FIG. 5 is triggered (block 702), the example signature generator 500 generates, updates, and/or receives light signatures and conveys the same to the example light signature database 502 of FIG. 5 (block 704). The generated light signatures are organized into sets of light signatures 504-520 in the example database 502 according to, for example, a lighting condition for which the respective light signatures are to be used. As described above, the light signatures of the database 502 correspond to light patterns known to correspond to a projection of light onto a person by a media presentation device.

The example light pattern identifier 526 of FIG. 5 obtains image data representative of the environment 100 from, for example, the multimodal sensor of FIGS. 1 and/or 2 (block 706). The obtained image data includes three-dimensional and/or two-dimensional data captured of the environment 100. The example light pattern identifier 526 analyzes the image data to determine whether the environment 100 includes a localized projection of light onto an object, such as a body part of person (block 708). In some examples, the analysis performed by the light pattern identifier 526 is focused on a portion of the image data corresponding to a face detected by the example people analyzer 206 as indicated in the coordinate 302 of FIG. 3.

If the example light pattern identifier 526 determines that the environment 100 includes a localized light pattern projected on an object (block 708), the example light condition sensor 522 of FIG. 5 detects a lighting condition for the environment 100 corresponding to the analyzed image data (block 710). For example, the light condition sensor 522 determines that the environment 100 includes a certain total amount of light, that the environment 100 includes a certain ratio of natural light to artificial light, and/or any other suitable lighting condition characteristic(s). The example signature set selector 524 of FIG. 5 uses the detected lighting condition of the environment 100 to select one or more of the sets of light signatures 504-520 of the database 502 (block 712). Thus, the example signature set selector 524 selects the appropriate light signatures for comparison to the detected localized light pattern identified by the example light pattern identifier 526.

The example comparator 530 of FIG. 5 compares the light signatures of the selected set(s) of light signatures to the detected light pattern detected on an object of the environment 100, such as the audience member 110 (block 714). The example comparator 530 generates a similar score for each comparison representative of a degree (e.g., a percentage) of similarity between the respective ones of the light signatures and the detected localized light pattern. The similarity scores and information indicative of the corresponding light signatures are provided to the example device identifier 532 of FIG. 5. The example device identifier 532 compares the received similarity scores to one or more thresholds to determine whether the detected light pattern in the image data is similar enough to the respective light signatures to indicate an interaction with a secondary media device (block 716). The comparison(s) of the device identifier 532 generate usage indication(s) and/or corresponding confidence level(s) when the threshold(s) are met or exceeded. As described above, the data generated by the example device identifier 532 is used by, for example, the engagement level calculator 400 of FIG. 4 to calculate a engagement level for the audience member 110 with respect to the primary media device 102 of FIG. 1.

In the example of FIG. 7, the example glow identifier 528 determines whether a glow similar to light emanating from a secondary media device is present in the image data provided by, for example, the multimodal sensor 104 of FIG. 1 (block 718). If such a glow is detected (block 718), the example glow identifier 528 measures a distance between the detected glow and any detected audience members (e.g., according to the people analyzer 206 of FIG. 2) (block 720). Further, the example glow identifier 528 detects one or more changes of the glow over a period of time and/or a number of frames of image data (block 722). Further, the example glow identifier 528 generates a presence indication to indicative, for example, that the second secondary media device 114 of FIG. 1 is present in the environment 100 (block 724). As described above, the data generated by the example glow identifier 528 can be used by, for example, the engagement level calculator 400 of FIG. 4 to calculate a engagement level for the audience member 110 with respect to the primary media device 102 of FIG. 1. Control then returns to block 702.

Figure 8:
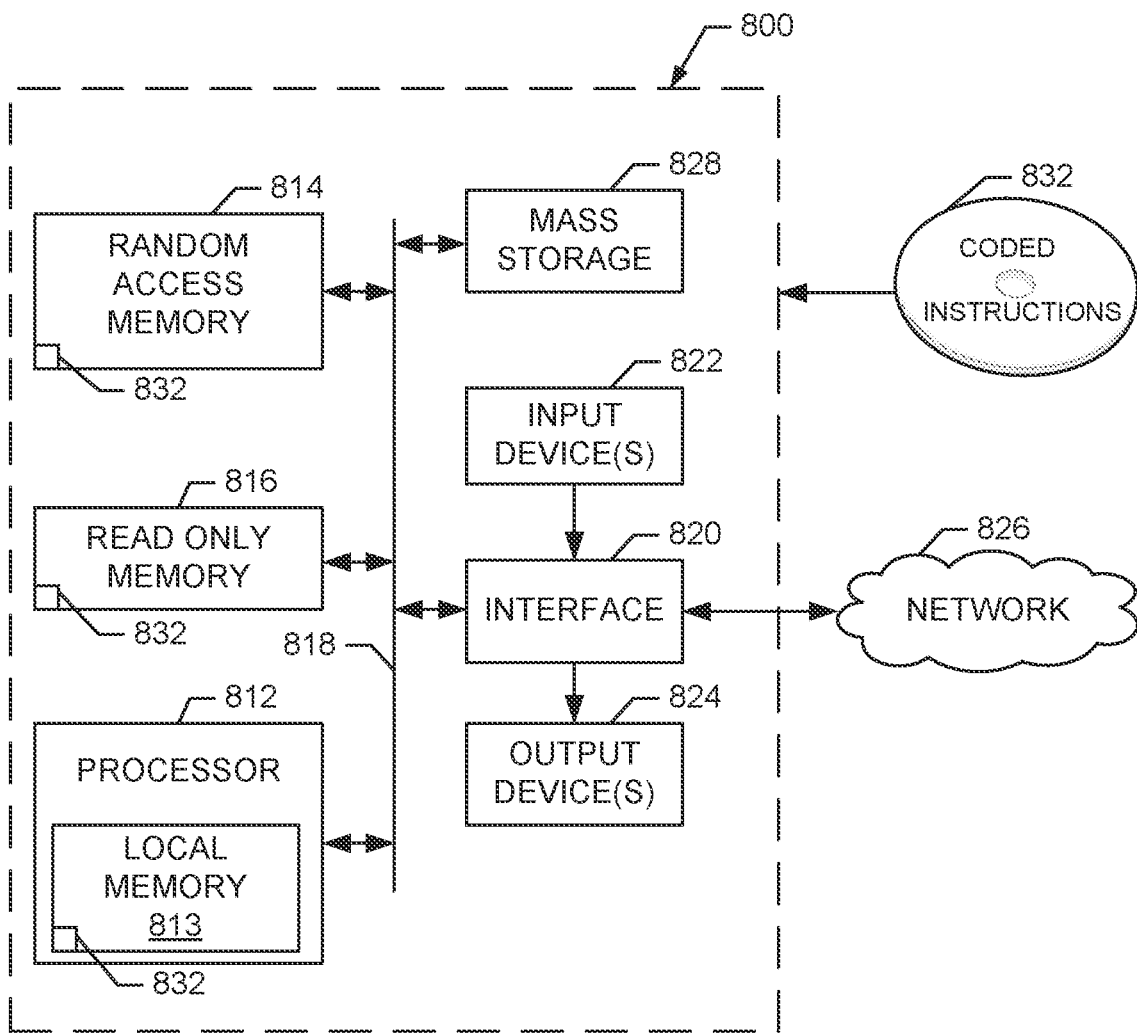
FIG. 8 is a block diagram of an example processing platform capable of executing the example machine readable instructions of FIG. 7 to implement the example secondary device detector of FIGS. 4 and/or 5.

FIG. 8 is a block diagram of an example processor platform 800 capable of executing the instructions of FIG. 7 to implement the example secondary device detector 410 of FIGS. 4 and/or 5. The processor platform 800 can be, for example, a server, a personal computer, a mobile phone, a personal digital assistant (PDA), an Internet appliance, a DVD player, a CD player, a digital video recorder, a BluRay player, a gaming console, a personal video recorder, a set-top box, an audience measurement device, or any other type of computing device.

The processor platform 800 of the instant example includes a processor 812. For example, the processor 812 can be implemented by one or more hardware processors, logic circuitry, cores, microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and data. Examples of such mass storage devices 828 include floppy disk drives, hard drive disks, compact disk drives and digital versatile disk (DVD) drives.

Coded instructions 832 (e.g., the machine readable instructions of FIG. 7) may be stored in the mass storage device 828, in the volatile memory 814, in the non-volatile memory 816, and/or on a removable storage medium such as a CD or DVD.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. An audience measurement system to obtain exposure data for a room of a panelist household, the audience measurement system comprising:
a dedicated audience measurement camera provided to a panelist household by an audience measurement entity, the dedicated audience measurement camera at a first position relative to a television for capturing images of the room of the panelist household, the television in the room of the panelist household; and
a dedicated audience measurement meter provided to the panelist household by the audience measurement entity, the dedicated audience measurement meter separate from the dedicated audience measurement camera and at a second position relative to the television for generating audio signatures representative of portions of media presented by the television, the dedicated audience measurement meter including:
a meter housing;
memory;
machine readable instructions;
one or more processors configured to execute the machine readable instructions to:
determine that the television is on,
based on determining that the television is on, cause the dedicated audience measurement camera to periodically image the room of the panelist household,
generate an audio signature of media presented by the television in the room of the panelist household, the audio signature based on a frequency spectrum representation of an audio signal of the media,
obtain, based on the audio signature, media identification data corresponding to the media,
determine, based on an image of an audience member obtained by the dedicated audience measurement camera while the media corresponding to the media identification data is presented, whether the audience member appearing in the image is facing toward the television, the image provided to the dedicated audience measurement meter by the dedicated audience measurement camera,
determine an engagement level for the audience member based on whether the audience member is facing toward the television, and
determine audience identification information based on a facial-recognition match between the audience member and a panelist associated with the panelist household; and
a network interface configured to output the exposure data to a data collection facility of the audience measurement entity via a network, the exposure data including the media identification data, the engagement level, and the audience identification information.

2. The audience measurement system of claim 1, wherein:
the data collection facility is managed by the audience measurement entity,
the panelist is registered with the audience measurement entity, and
the one or more processors are configured to determine the audience identification information by performing facial recognition based on the image of the audience member and a facial signature associated with the panelist.

3. The audience measurement system of claim 2, wherein the one or more processors are configured to:
obtain the facial signature of the panelist based on an image of the panelist;
obtain panelist identification data from the panelist; and
cause storage of the facial signature in a database in association with the panelist identification data.

4. The audience measurement system of claim 2, wherein:
the dedicated audience measurement camera is above or below the television, and
the dedicated audience measurement meter and the dedicated audience measurement camera communicate via a wired connection.

5. The audience measurement system of claim 2, wherein the audience identification information includes an identifier associated with the panelist.

6. The audience measurement system of claim 2, wherein the engagement level is an attentiveness metric indicative of how attentive the audience member is to the television.

7. The audience measurement system of claim 1, wherein the one or more processors are configured to determine whether the audience member is facing toward the television by: (i) obtaining a skeletal framework corresponding to a body of the audience member based on the image, (ii) identifying a head pose of the audience member based on the skeletal framework, and (iii) using the identified head pose to determine whether the audience member is facing toward the television.

8. The audience measurement system of claim 7, wherein the one or more processors are configured to identify an emotional state of the audience member based on the identified head pose.

9. The audience measurement system of claim 1, wherein the one or more processors are configured to analyze the image to determine a people tally, the people tally indicative of a count of people in the room of the panelist household while the media corresponding to the media identification data is presented.

10. The audience measurement system of claim 1, wherein the one or more processors are configured to:
obtain data indicative of a portion of the image known to include a person, and
determine whether the audience member is facing toward the television by analyzing the portion of the image indicated by the obtained data.

11. The audience measurement system of claim 1, wherein the one or more processors are configured to determine the engagement level based on a calculated difference between a direct line of sight and an eye gaze direction.

12. The audience measurement system of claim 1, wherein the dedicated audience measurement meter is not installed on consumer electronics owned by the panelist.

13. The audience measurement system of claim 1, wherein the dedicated audience measurement meter is configured to communicate with the dedicated audience measurement camera without interaction with consumer electronics owned by the panelist.

14. The audience measurement system of claim 1, wherein:
the engagement level is indicative of how attentive the audience member is to the television, and
the engagement level is based further on whether the audience member is sleeping.

15. The audience measurement system of claim 1, wherein the meter does not deliver the media presented by the television to the television.

16. The audience measurement system of claim 1, wherein:
the media is delivered to the television by a set-top box having a set-top box housing, and
the meter housing is separate from the set-top box housing.

17. An audience measurement system comprising:
a dedicated audience measurement camera provided to a panelist household by an audience measurement entity, the dedicated audience measurement camera at a first position relative to a television for capturing images of a room of the panelist household, the television in the room of the panelist household; and
a dedicated audience measurement meter provided to a panelist household by the audience measurement entity, the dedicated audience measurement meter separate from the dedicated audience measurement camera and at a second position relative to the television for generating audio signatures representative of portions of media presented by the television, the dedicated audience measurement meter including:
a meter housing;
machine readable instructions; and
one or more processors configured to execute the machine readable instructions to:
determine that the television is presenting media,
based on determining that the television is presenting media, cause the dedicated audience measurement camera to periodically image the room of the panelist household,
generate an audio signature of the media presented by the television in the room of the panelist household, the audio signature based on a frequency spectrum representation of an audio signal of the media,
obtain media identification data based on the audio signature, the media identification data corresponding to the media,
analyze an image of the room of the panelist household to determine whether an audience member is facing toward the television in the room of the panelist household, the image captured by the dedicated audience measurement camera while the media corresponding to the media identification data is presented on the television, the image provided to the dedicated audience measurement meter by the dedicated audience measurement camera,
determine an engagement level of the audience member based on whether the audience member is facing toward the television;
determine audience identification information based on a facial-recognition match between the audience member and a panelist associated with the panelist household; and
cause exposure data including the media identification data, the engagement level, and the audience identification information to be provided to a data collection facility of the audience measurement entity via a network.

18. The audience measurement system of claim 17, wherein the data collection facility is associated with the audience measurement entity, the panelist is a registered panelist of the audience measurement entity, and the one or more processors are configured to:
determine the audience identification information by performing facial recognition based on the image and a facial signature associated with the panelist;
obtain a facial signature of the panelist;
obtain panelist identifying data from the panelist; and
cause storage of the facial signature and the panelist identifying data in a database.

19. The audience measurement system of claim 17, wherein the dedicated audience measurement camera is above or below the television, and the dedicated audience measurement meter is configured to communicate with the dedicated audience measurement camera via a wired connection.

20. The audience measurement system of claim 17, wherein the audience identification information includes an identifier associated with the audience member.

21. The audience measurement system of claim 17, wherein the engagement level is indicative of a degree of attentiveness of the audience member to the media.

22. The audience measurement system of claim 17, wherein the one or more processors are configured to determine whether the audience member is facing toward the television based on a head pose of the audience member in the image.

23. The audience measurement system of claim 17, wherein the one or more processors are configured to analyze the image to determine a people tally indicative of a number of people in the room of the panelist household.

24. The audience measurement system of claim 17, wherein the one or more processors are configured to analyze the image to determine a number of people exposed to the media in the room of the panelist household.

25. A method for obtaining exposure data for a room of a panelist household, the method comprising:
based on determining that a television in the room of the panelist household is on, causing a dedicated audience measurement camera to periodically image the room of the panelist household;
generating, with a dedicated audience measurement meter provided to the panelist household by an audience measurement entity, an audio signature of media presented by the television, the audio signature based on a frequency spectrum representation of an audio signal of the media, the dedicated audience measurement meter at a first position relative to the television for generating audio signatures representative of portions of media presented by the television;
obtaining, with the dedicated audience measurement meter, and based on the audio signature, media identification data corresponding to the media;
determining, with the dedicated audience measurement meter, and using an image obtained while the media corresponding to the media identification data is presented, whether an audience member is facing toward the television, the image captured by the dedicated audience measurement camera, the dedicated audience measurement camera provided to the panelist household by the audience measurement entity, the dedicated audience measurement meter separate from the dedicated audience measurement camera, the dedicated audience measurement camera at a second position relative to the television for capturing images of the room of the panelist household;
determining, with the dedicated audience measurement meter, an engagement level for the audience member based on whether the audience member is facing toward the television;
determining, with the dedicated audience measurement meter, audience identification information of a panelist associated with an audience measurement system, the panelist corresponding to the audience member; and
providing the media identification data, the engagement level, and the audience identification information to a data collection facility of the audience measurement entity via a network.

26. The method of claim 25, wherein:
the data collection facility is managed by the audience measurement entity, and further including registering the panelist with the audience measurement entity; and
wherein the registering of the panelist further includes:
obtaining a facial signature of the panelist;
obtaining, from the panelist, data identifying the panelist; and
storing the facial signature and the data identifying the panelist in a database.

27. The method of claim 25, wherein the determining of whether the audience member is facing toward the television using the image includes:
obtaining a skeletal framework corresponding to a body of the audience member, the skeletal framework based on the image;
identifying a head pose of the audience member based on the skeletal framework; and
using the identified head pose to determine whether the audience member is facing toward the television.

28. The method of claim 25, further including:
obtaining data indicative of a portion of the image known to include a person; and
wherein the determining of whether the audience member is facing toward the television is based on the portion of the image known to include the person.

29. A method for obtaining exposure data for a room of a panelist household, the method comprising:
based on determining that a television in the room of the panelist household is presenting media, causing a dedicated audience measurement camera to periodically image the room of the panelist household;
generating, with a dedicated audience measurement meter provided to the panelist household by an audience measurement entity, an audio signature of media presented by the television, the audio signature based on a frequency spectrum representation of an audio signal of the media, the dedicated audience measurement meter at a first position relative to the television for generating audio signatures representative of portions of media presented by the television;
obtaining, with the dedicated audience measurement meter, and based on the audio signature, media identification data corresponding to the media;
determining, with the dedicated audience measurement meter, and using an image obtained while the media corresponding to the media identification data is presented, whether an audience member is facing toward the television, the image captured by the dedicated audience measurement camera, the dedicated audience measurement camera provided to the panelist household by the audience measurement entity, the dedicated audience measurement meter separate from the dedicated audience measurement camera, the dedicated audience measurement camera at a second position relative to the television for capturing images of the room of the panelist household;
determining, with the dedicated audience measurement meter, an engagement level for the audience member based on whether the audience member is facing toward the television;
determining, with the dedicated audience measurement meter, audience identification information of a panelist associated with an audience measurement system, the panelist corresponding to the audience member; and
providing the media identification data, the engagement level, and the audience identification information to a data collection facility of the audience measurement entity via a network.

30. The method of claim 29, wherein:
the data collection facility is managed by the audience measurement entity, and further including registering the panelist with the audience measurement entity; and
wherein the registering of the panelist further includes:
obtaining a facial signature of the panelist;
obtaining, from the panelist, data identifying the panelist; and
storing the facial signature and the data identifying the panelist in a database.

* * * * *